United States Patent
Regli et al.

(10) Patent No.: US 8,266,079 B2
(45) Date of Patent: Sep. 11, 2012

(54) MULTI-SCALE SEGMENTATION AND PARTIAL MATCHING 3D MODELS

(75) Inventors: William C. Regli, Philadelphia, PA (US); Ali Shokoufandeh, New Hope, PA (US); Dmitriy Bespalov, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 13/185,532

(22) Filed: Jul. 19, 2011

(65) Prior Publication Data

US 2012/0136860 A1 May 31, 2012

Related U.S. Application Data

(62) Division of application No. 11/847,942, filed on Aug. 30, 2007, now Pat. No. 8,015,125.

(60) Provisional application No. 60/824,171, filed on Aug. 31, 2006.

(51) Int. Cl.
*G06F 15/18* (2006.01)

(52) U.S. Cl. ........................................................ 706/12

(58) Field of Classification Search ........................ None
See application file for complete search history.

(56) References Cited

U.S. PATENT DOCUMENTS

| | | |
|---|---|---|
| 2003/0208285 A1 | 11/2003 | Regli et al. |
| 2008/0215510 A1 | 9/2008 | Regli et al. |

OTHER PUBLICATIONS

Bespalov et al. "Local Feature Extraction Using Scale-Space Decomposition", DETC'04, pp. 1-10.*

Tangelder et al. "A Survey of Content Based 3D Shape Retrieval Methods", Shape Modeling International, 2004, pp. 1-12.*

Vong et al. "Case-based reasoning and adaptation in hydraulic production machine design", Engineering Application of Artificial Intelligence 15 (2002) pp. 567-585.*

Funkhouser et al. "A Search Engine for 3D Models", ACM Trans. Graphics, vol. 22, No. 1, 2003, pp. 83-105.*

Han et al, "Manufacturing Feature Recognition from Solid Models: A Status Report", IEEE Transactions on Robotics and Automation, 2000, pp. 782-796,vol. 16, No. 6.

Shah et al, "A Discourse on Geometric Feature Recognition from CAD Models", Journal of Computing and Information Science in Engineering, 2001, vol. 1-, p. 41-51.

Bespalov et al, "Scale-Space Representation and Classification of 3D Models", Drexel University, Philadelphia, PA, Oct. 17, 2003.

(Continued)

*Primary Examiner* — Alan Chen
*Assistant Examiner* — Li-Wu Chang
(74) *Attorney, Agent, or Firm* — Knoble Yoshida & Dunleavy, LLC

(57) ABSTRACT

A scale-Space feature extraction technique is based on recursive decomposition of polyhedral surfaces into surface patches. The experimental results show that this technique can be used to perform matching based on local model structure. Scale-space techniques can be parameterized to generate decompositions that correspond to manufacturing, assembly or surface features relevant to mechanical design. One application of these techniques is to support matching and content-based retrieval of solid models. Scale-space technique can extract features that are invariant with respect to the global structure of the model as well as small perturbations that 3D laser scanning may introduce. A new distance function defined on triangles instead of points is introduced. This technique offers a new way to control the feature decomposition process, which results in extraction of features that are more meaningful from an engineering viewpoint. The technique is computationally practical for use in indexing large models.

16 Claims, 16 Drawing Sheets

(a) Decomposition tree is obtained using FEATURE-DECOMPOSITION($M, k$) algorithm.

OTHER PUBLICATIONS

Bespalov et al, "Local Feature Extraction and Matching Partial Objects", Drexel University, Philadelphia, PA, Mar. 20, 2006.

Bespalov et al, "Scale-Space Representation and Classification of 3D Models and Topological Matching", SM'03, Jun. 16-20, 2003.

Bespalov et al, "Local Feature Extraction Using Scale-Space Decomposition", Proceedings of DETC 2004, ASME Design Engineering Technical Conferences, Salt Lake City, UT, pp. 1-10.

Cicirello, Vincent A., "Intelligent Retrieval of Solid Models", Thesis Submitted to Drexel University, Jun. 1999.

Bespalov et al, "Reeb Graph Based Shape Retrieval for CAD", Proceedings of DETC 2003, ASME Design Engineering Technical Conferences, Chicago, IL.

Peysakhov et al., "Using Assembly Representations to Enable Evolutionary Design of Lego Structures", 2003, Drexel University, Philadelphia, PA.

Iyer et al, "A Reconfigurable 3D Engineering Shape Search System Part I: Shape Representation", Proceedings of DETC 2003, ASME 2003 Design Engineering Technical Conferences and Computers and Information in Engineering Conference, Chicago, IL.

Lou et al, "A Reconfigurable 3D Engineering Shape Search System Part II: Database Indexing, Retrieval and Clustering", Proceedings of ASME DETC 2003, 23rd Computers and Information in Engineering (CIE) Conference, Chicago, IL.

Lou et al, "Content-based Three-dimensional Engineering Shape Search", Proceedings of the 20th International Conference on Data Engineering, 2004.

IP et al, "Automated Learning of Model Classifications", SM 2003, pp. 322-327, Seattle, WA.

Bespalov et al, "Scale-Space Representation of 3D Models and Topological Matching", SM 2003, Seattle, WA.

Bespalov et al, "Local Feature Extraction Using Scale-Space Decomposition", Proceedings of DETC 2004, ASME Design Enginerring Technical Conferences, Salt Lake City, UT.

Bespalov et al, "Scale-Space Representation and Classification of 3D Models", Journal of Computing and Information in Science in Engineering, Dec. 2003, vol. 3, pp. 315-324.

Cybenko et al, "Pattern Recognition of 3D CAD Objects: Towards an Electronic Yellow Pages of Mechanical Parts", Smart Engineering Systems Design, vol. 1, pp. 1-13, 1996.

McWherter et al, "Solid Model Databases: Techniques and Empirical Results", Journal of Computing and Information Science in Engineering, 2001, vol. 1, pp. 300-310.

Regli et al, "Managing Digital Libraries for Computer-Aided Design", Drexel University, Philadelphia, PA, 1999, pp. 1-20.

Elinson, et al, "Feature-based similarity assessment of solid models". In Fourth Symposium on Solid Modeling and Applications, C. Hoffman and W. Bronsvoort, Eds., ACM, ACM Press, 1997 pp. 297-310. Atlanta, GA.

Cornea et al, "3D Object Retrieval using Many-to-many Matching of Curve Skeltons", Rutgers University, Drexel University, University of Toronto, 2005, pp. 6.

Funkhouser et al, "Modeling by example". In SIGGRAPH, ACM 2004.

Ji et al, Machine Interpretation of CAD Data for Manufacturing Applications, ACM Computing Surveys, 1997, vol. 24, No. 3.

Cardone et al, A Survey of Shape Similarity Assessment Algorithms for Product Design and Manufacturing Applications, Journal of Computing and Information Science in Engineering, 2003, vol. 3, pp. 109-118.

Tangelder et al, "A Survey of Content Based 3D Shape Retrieval Methods", 2004, Institute of Information and Computing Sciences, Utrecht University, pp. 1-12.

Iyer et al, "Three-dimensional shape searching: state-of-the-art review and future trends", Elsevier, Computer-Aided Design 37 (2005), pp. 509-530.

Cicirello et al, "Machining Feature-based Comparisons of Mechanical Parts", 2001 IEEE, pp. 176.184.

Shilane et al. "The Princeton Shape Benchmark" SMI, 2004, number of pp. 13.

* cited by examiner (a) Geodesic Distance Function (b) Angular Shortest Path (c) Max-Angle on Angular Shortest Path

SAMPLE VIEW OF
THE MODEL

DECOMPOSITION USING GEODESIC
DISTANCE FUNCTION

DECOMPOSITION USING ANGULAR
SHORTEST PATH DISTANCE FUNCTION

DECOMPOSITION USING
MAX-ANGLE DISTANCE
FUNCTION (a) Decomposition tree is obtained using FEATURE-DECOMPOSITION($M, k$) algorithm.

(b) Leaf nodes of the tree correspond to the features.

| | Full Model | Partial Models | | |
|---|---|---|---|---|
| CIMPLEX | | | | |
| SIMPLE BOEING | | | | |
| PART 9 | | | | |
| PART 10 | | | | |

Figure 6

(a) Single Scan – take one scan from a single view (b) multiple scans

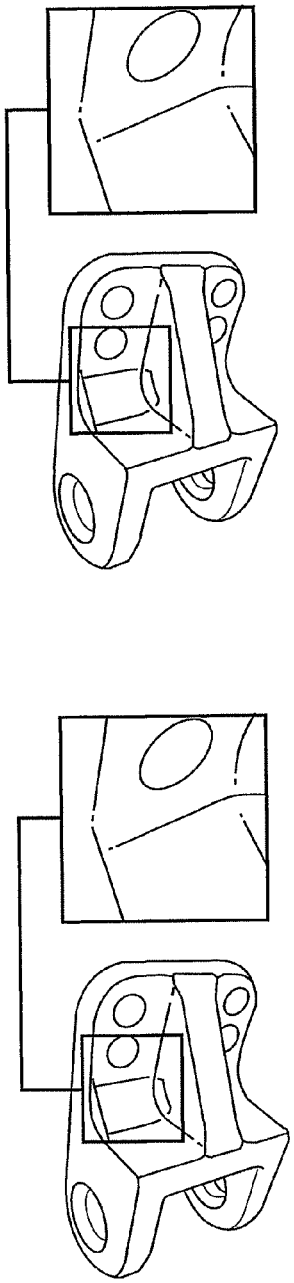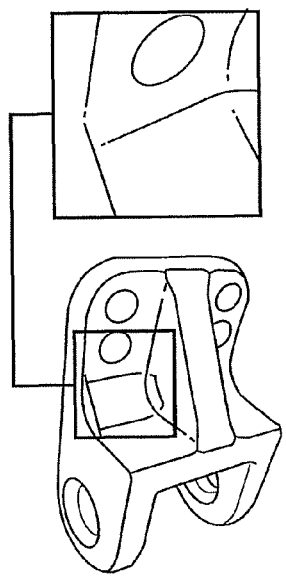
FIG. 11A  LOW FIDELITY, NORMAL TOLERANCE=50
FIG. 11B  LOW FIDELITY, NORMAL TOLERANCE=15
FIG. 11C  LOW FIDELITY, NORMAL TOLERANCE=5

(a) Original Scale-Space technique with geodesic distance function (b) Scale-Space technique with max-angle distance function (sub-graph isomorphism algorithm used for matching)

| QUERY | RETURNED MODELS |
|---|---|
| FULL SCAN 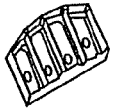 |   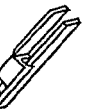 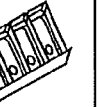 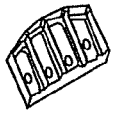 |
| SINGLE SCAN  |  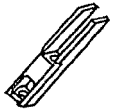 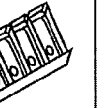 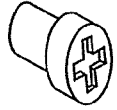  |
| PARTIAL CAD 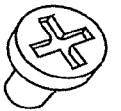 | 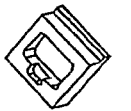  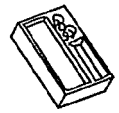   |
| FULL SCAN 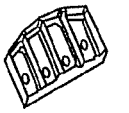 | 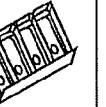   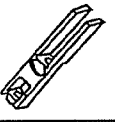  |
| SINGLE SCAN  | 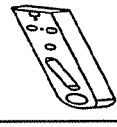 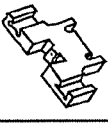  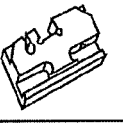  |
| PARTIAL CAD 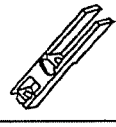 | 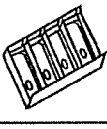    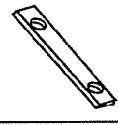 |
| FULL SCAN 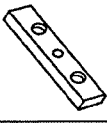 |  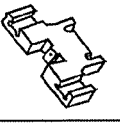 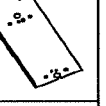 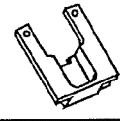 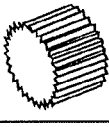 |
| SINGLE SCAN 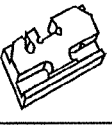 | 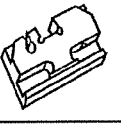 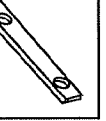 |
*FIG. 13*

MULTI-SCALE SEGMENTATION AND PARTIAL MATCHING 3D MODELS

This application is a Continuation of U.S. patent application Ser. No. 11/847,942 filed Aug. 30, 2007, the contents of which are incorporated herein by reference.

STATEMENT REGARDING FEDERALLY SPONSORED RESEARCH OR DEVELOPMENT

This work was made with Government support under Contract No. IIS-0456001, awarded by the Library of Congress' National Digital Information Infrastructure and Preservation Program (NDIIPP) through the National Science Foundation (NSF) DIGARCH Program, Contract No. CISE/IIS-9733545 career award awarded by the NSF, and Contract No. N00014-01-1-0618 awarded by the Office of Naval Research (ONR) Grant. The Government has certain rights in the invention.

BACKGROUND OF THE INVENTION

1. Field of the Invention

The invention relates to the field of solid model classification and searching. In particular it relates to a method and system for classifying and searching solid models using a learning algorithm.

2. Description of the Related Technology

In order to perform content-based indexing and retrieval of 3D objects, each model must be converted into some collection of features. Previous research on model matching and retrieval has drawn on feature definitions from mechanical design, computer graphics and computer vision literature. Many of these feature-based techniques ultimately use vertex-labeled graphs, whose nodes represent 3D features (or their abstractions) and whose edges represent spatial relations or constraints, between the features. Retrieval and matching is done using some variation of graph matching to assign a numerical value describing the distance between two models. The computer vision research community has typically viewed shape matching as a problem in 2D [11, 12, 13, 14]. These efforts address a different aspect of the general geometric/solid model matching problem—one in which the main technical challenge is the construction of the models to be matched from image data obtained by cameras.

This has changed in the past several years with the ready availability of 3D models (usually meshes or point clouds) generated from range and sensor data. Thompson et al. [15, 16] reverse engineered designs by generating surfaces and machining feature information from range data collected from machined parts. Jain et al. [17] indexed CAD data based on the creation of "feature vectors" from 2D images. Sipe, Casasent and Talukder [18, 19] used acquired 2D image data to correlate real machined parts with CAD models and performed classification and pose estimation.

There are numerous surveys of feature recognition techniques for CAD [2, 3]; and similarity assessment of 3D models using feature extraction has been addressed [4, 5, 6]. These techniques use an exact representation, as is obtained from a CAD system (i.e., a 3D, watertight boundary representation). However, these representations are proprietary, and their internals vary from system to system. Feature-based descriptions of models also vary by system. Hence, CAD search tools that can perform semantically effective searches using "the lowest common denominator" (e.g., shape) representation are desirable.

Matching 3D shape representations has been widely studied in graphics [7], computer vision [8] and engineering [9]. When shape representations have been used with CAD data, there have been two major shortcomings. First, the current generation of matching techniques has difficulty handling the approximate representations (i.e., polyhedral mesh, point cloud, etc.) that are needed to find sub-patterns in objects or handle data created by 3D scanners. With a few notable exceptions, most researchers assume watertight VRML or shape models. Second, and more importantly, the current generation of search techniques almost exclusively focus on gross or overall shape. In the context of CAD, local features and feature patterns contribute considerably to manufacturing cost, selection of manufacturing processes, produceability and functional parameters of 3D objects. Many objects with similar gross shape can have vastly different functions, costs or manufacturing process specifications.

Once objects are recognized, they can be segmented, decomposed and matched. Matching is frequently accomplished by encoding objects and their decompositions as a graph and analyzing across different graph structures to identify similarity. Graphs and their generalizations are among the most common combinatorial structures in computer science, due in large part to the number of areas of research in which they are applicable. Nayar and Murase extended this work to general 3D objects where a dense set of views was acquired for each object [21]. Eigen-based representations have been widely used in many areas for information retrieval and matching as they offer greater potential for generic shape description and matching. In an attempt to index into a database of graphs, Sossa and Horaud use a small subset of the coefficients of the d2-polynomial corresponding to the Laplacian matrix associated with a graph [22], while a spectral graph decomposition was reported by Sengupta and Boyer for the partitioning of a database of 3D models, in which nodes in a graph represent 3D surface patches [23].

With the ready availability of 3D models from graphics programs and CAD systems, there has been a substantial amount of activity on 3D object recognition and matching in the past 20 years. This body of relevant work is too large to survey in detail in this patent application. Several recent survey papers [8, 9, 7] covers the related work.

Shape-based approaches usually work on a low-level point cloud, mesh or polyhedral model data, such as that produced by digital animation tools or acquired by 3D range scanners. Approaches based on faceted representations include that of Osada et al. [30], which creates an abstraction of the 3D model as a probability distribution of samples from a set of shape functions acting on the model. Hilaga et al. [31] present a method for matching 3D topological models using multi-resolution Reeb graphs. A variant on this is proposed in [32]. A current trend, being pursued by several groups, is the use of different types of shape descriptors (harmonics, Zernike, etc.) to capture shape invariants [33, 34, 35, 36]. The Princeton 3D shape database [37] contains mainly models from 3D graphics and rendering; none of these models are specifically engineering, solid modeling or mechanical CAD oriented.

In general, however, shape matching-based approaches only operate on the gross-shape of a single part and do not operate directly on solid models or consider semantically meaningful engineering information (i.e., manufacturing or design features, tolerances). Retrieval strategies are usually based on a query-by-example or query-by-sketch paradigm.

Unlike shape models, for which only approximate geometry and topology is available, solid models produced by CAD systems are represented by precise boundary representations. When comparing solid models of 3D CAD data, there are two basic types of approaches for content-based matching and retrieval: (1) feature-based techniques and (2) shape-based techniques. The feature-based techniques [38, 2, 39, 3, 40], going back at least as far as 1980[41], extract engineering features (machining features, form features, etc.) from a solid model of a mechanical part for use in database storage, automated group technology (GT) part coding, etc. graphics. These techniques leverage the ready availability of 3D models on the Internet.

Historically Group Technology (GT) coding was the way to index parts and part families [42]. This facilitated process planning and cell-based manufacturing by imposing a classification scheme (a human-assigned alphanumeric string) to individual machined parts. While there have been a number of attempts to automate the generation of GT codes [43, 44, 45], transition to commercial practice has been limited.

The idea of similarity assessment of 3D models using feature extraction techniques has been discussed [2, 3]. These techniques assume the exact representation (i.e., boundary representation or "B-rep") for the input models and therefore cannot be used if only an approximate representation (i.e., polyhedral mesh) is available. This is a major shortcoming, especially in designing an archival system, where one may require partial and inexact matching.

There has been recent work on partial matching in the context of 3D data. For instance, Funkhouser et al. successfully employed shape-based search in [46] for 3D models with parts of those models matching a query. In addition, Cornea et al. used approach for many-to-many matching of skeletons of 3D objects in [47] to perform retrieval on those objects.

Elinson et al. [48] used feature-based reasoning for retrieval of solid models for use in variant process planning. Cicirello and Regli [49, 5, 4] examined how to develop graph-based data structures and create heuristic similarity measures among artifacts based on manufacturing features. McWherter et al. [50] integrated these ideas with database techniques to enable indexing and clustering of CAD models based on shape and engineering properties. Other work from the engineering community includes techniques for automatic detection of part families [51] and topological similarity assessment of polyhedral models [52].

Comparing CAD models based on their boundary representations can be difficult due to variability in the underlying feature-based representations. Additional complications are created by differences among the boundary representations used by systems (i.e., some may use all NURBS, some may use a mix of surface types, etc). Using a shape-based approach on voxels, meshes or polyhedral models generated from native CAD representations is one way of reducing these problems.

The 3D-Base Project [53, 54] used CAD models in a voxel representation, which were then used to perform comparisons using geometric moments and other features. Shape classification, scale-space decomposition and classification learning are addressed in recent works [55, 56, 57, 58].

Work out of Purdue [59, 60, 61] has improved on the voxel methods of [53, 54], augmenting them with skeletal structures akin to medial axes or shock graphs. The main accomplishment of the Purdue group is getting these shape-only techniques in a system for query by example.

Despite the many variations on these concepts, there remains a need for improvements in the methods and systems employed for solid model classification and searching.

SUMMARY OF THE INVENTION

According to a first aspect of the invention, there is a provided a method employing a scale-space decomposition technique to automatically decompose a 3D model into structurally relevant components according to parameters. These decompositions can be parameterized with a measure function, resulting in different components and features. This allows the performance of efficient comparisons (using well studied tree-matching algorithms) of 3D models in terms of the similarity of underlying features. Different measure functions are created to tailor decompositions toward feature sets tuned to answer specific questions (i.e., cost, manufacturing process, shape, etc).

According to a second aspect of the invention, the method is used to improve the performance consistency of scanned data. Most existing work on shape and solid matching assumes an ideal world with watertight models and no inaccuracies or perturbations (normally introduced through scanning). The reality is that objects may not be perfect, this is especially true when trying to examine 3D models acquired by laser scanning or other means (i.e., image, inspection probes, etc). In this context, one needs to be able to compare the noisy acquired data to other noisy data or to the exact geometry data that exists in a database of CAD (Computer-Aided Design) models. The multi-scale technique has shown consistency in its performance on scanned data, both with synthetic perturbations (simulation of scanning process) as well as with respect to the actual inaccuracy introduced through laser scanning. Hence, models can be effectively matched across representations.

According to a third aspect of the invention, the method employs a partial matching technique. Partial matching is a major open problem in 3D indexing and matching. It manifests itself in several ways. Most evident is that acquired data is rarely complete. For example, occlusion prevents scanners from getting interior points of holes and other features. In addition, obtaining a "complete" scan is time consuming, requiring manual re-positioning of objects on the scanning apparatus and (quite often) manual registration of the point set data acquired by these scans. In the most basic case, the scanned data may consist of only one "view" of the model—resulting in a set of points on the 2D manifold in 3D space and not a 3D shape.

According to a fourth aspect, the invention provides the ability to handle partial data, as well as to perform consistently on scanned data. This allows implementation of a system that can go from scanned data input directly to a database query with minimal human intervention. With even the best of present technology, it is difficult to get complete watertight solids from scanned data that precisely match the scanned object. In the case of CAD objects, most of which have high genus and many occluded surfaces, obtaining a complete scan that evenly samples points over the surfaces is simply impossible. Hence, matching and query mechanisms must be able to operate from limited information, i.e., point data or portions of surfaces.

According to a fifth aspect of the invention, many-to-many matching may be used to align the corresponding decomposition from one medium (e.g., the native CAD object) with that of other media (e.g., scanned data) and similar, but slightly different, CAD objects. The decomposition process of the present invention is consistent across these different media types; however, the exact boundaries of the segmentations may vary depending on the quality of the data, perturbations due to 3D laser scanning or differences in the underlying geometric representation. This creates a many-to-many matching problem in which subsets of segments from one object must be paired to subsets of the segments resulting from the decomposition of another object.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 6 illustrates extracted features from CAD models with 2% Gaussian noise applied to each point of the model.

FIGS. 11a-11C illustrate variable fidelity data sets.

FIG. 13 illustrates retrieval experiments using partial and scanned data wherein the five closest models were retrieved from the database.

DETAILED DESCRIPTION OF THE PREFERRED EMBODIMENT(S)

Figure 1A:
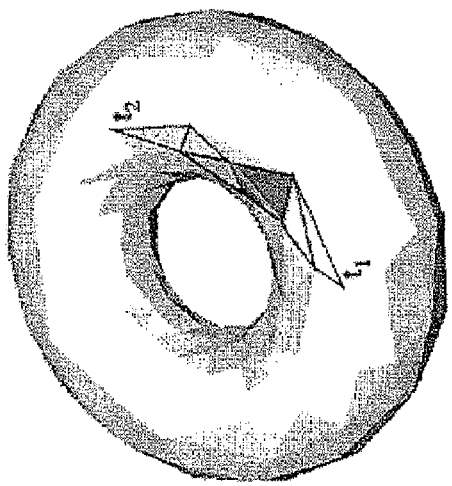
FIGS. 1a-1c illustrate various distance functions for scale space decomposition.

This invention develops a feature decomposition method that can be parameterized and is tuned to extract local feature configurations of engineering significance. The present invention also addresses the problem of partial matching in the context of acquired data and presents an end-to-end methodology for evaluation.

It is common in engineering communities for the term, "feature" to be used to refer to machining features (i.e., holes, pockets, slots) or other local geometric or topological characteristics of interest, depending on the domain (i.e., assembly surfaces, molding lines, etc). In the context of this patent application, "feature" will be used as an intrinsic property of the 3D shape, which may encompass local geometry and topology. Depending on the choice of function to parameterize the multi-scale decomposition, these local features could correspond to design or manufacturing operations, machining features or assembly surfaces, etc.

I. Sub-Space Clustering and Scale-Space Decomposition

During the last decade, hierarchical segmentation has become recognized as a powerful tool for designing efficient algorithms. The most common form of such hierarchical segmentation is the scale-space decomposition in computer vision. Intuitively, an inherent property of real-world objects is that they only exist as meaningful entities over certain ranges of scale. The fact that objects in the world appear in different ways depending on the scale of observation has important implications if one aims at describing them. Specifically, the need for multi-scale representation arises when designing methods for automatically analyzing and deriving information from real-world measurements.

In the context of solid models, the notion of scale can be simplified in terms of the levels of 3D features rather than the CAD literature. Namely, given an object $\mathcal{M}$ we are interested in partitioning $\mathcal{M}$, into k features $\mathcal{M}_1, \ldots \mathcal{M}_k$ with $\mathcal{M}_i \cap \mathcal{M}_j = \emptyset$, for $1 \leq i < j \leq k$, and $\mathcal{M} = \cup_i \mathcal{M}_i$ subject to maximization of some coherence measure, $f(\mathcal{M}_i)$, defined on the 3D elements forming each $\mathcal{M}_i$. At a finer scale, each feature $\mathcal{M}_i$ will be decomposed into $j=1, \ldots, k$ sub-features, subject to the maximization of some coherence measures.

There are three central components in the aforementioned process: the number of components at each scale of decomposition, k; the feature coherence function $f(.)$; and the number of scales of the decomposition process, l. In most pattern recognition applications, k is a known control parameter. If models $\mathcal{M}$ and $\mathcal{M}'$ are topologically similar, the k major components at every scale should also be similar. The coherence function $f(\mathcal{M}^i)$ will assign an overall metric to the quality of 3D elements participating in the construction of feature $\mathcal{M}^i$. Finally, the depth of decomposition will be controlled depending on the quality of a feature in comparison to all its sub-features.

Specifically, assume $\mathcal{M}^i$ represents a feature at scale i, and $\mathcal{M}_1^{i+1}, \ldots, \mathcal{M}_j^{i+1}$, for $j \leq k$ represent its sub-features at scale $i+1$. The decomposition process should proceed to scale i+1 with respect to feature $\mathcal{M}^i$ if and only if $f(\mathcal{M}^{i+1}) \leq f(\mathcal{M}_1^{i+1}) + f(\mathcal{M}_2^{i+1}) + \ldots + f(\mathcal{M}_j^{i+1})$. This simple criterion for multi-scale expansion at every feature has its roots in information theory. It is in fact motivated by a linear form similar to entropy of feature $\mathcal{M}^i$ as opposed to its sub-features $\mathcal{M}_1^{i+1}, \ldots, \mathcal{M}_j^{i+1}$. In the end, a set of the leaf nodes in a decomposition tree would correspond to the final features of a given model.

II. Distance Function

A 3D model $\mathcal{M}$ is given in polyhedral representation (models in VRML format were used in the experiments). This model is decomposed into k sub-features using scale-space decomposition. The application of scale-space decomposition requires some distance function $\mathcal{D}(\ldots)$ that captures the affine invariant structure of a model M. The shortest-path metric $\delta(\ldots)$ (geodesic distance [62]) on the triangulation of $\mathcal{M}$ with respect to points $\{v_1, \ldots, v_n\}$, is one such function. In this case, the distance function $\mathcal{D}(u, v) = \delta(u, v)$ would be the length of the shortest path distance on the triangulated surface between u and v for all u, v $\in \mathcal{M}$.

Figure 1B:
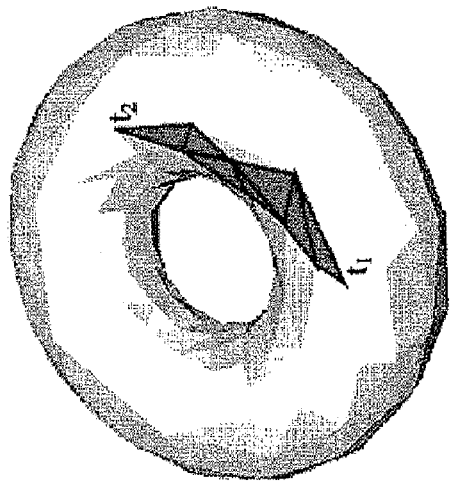
Figure 1C:
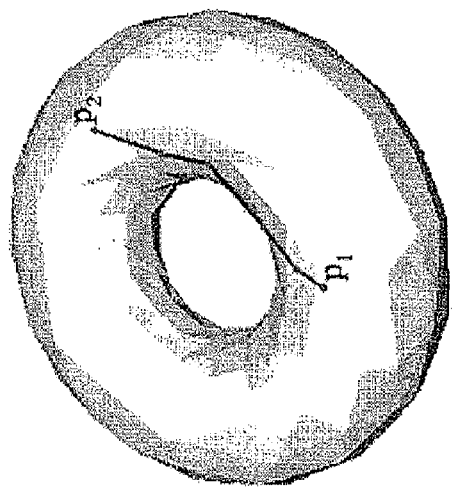

In our previous work [10] metric $\delta(\ldots)$ was successfully used for scale-space decomposition. The experimental results showed that the measure $\delta(\ldots)$ successfully captures affine structure of the model $\mathcal{M}$ and produces meaningful decompositions. The problem with such a distance measure is that it captures global information of the model. Even small perturbations of the model $\mathcal{M}$ may cause the distance function $\mathcal{D}(\ldots)$ to vary significantly, which in its turn, changes extracted features. Further, using geodesic distance as a measure for decomposition does not tolerate small perturbations (i.e., laser-scanned data) very well. FIGS. 1a-1c illustrate several distance functions that could be used in multi-scale decomposition. Specifically, FIG. 1(a) shows a geodesic distance function (weight of the shortest path between points) between points $p_1$ and $p_2$; FIG. 1(b) illustrates angular shortest path (weight of the shortest path computed using an angular measure) distance between faces $t_1$ and $t_2$; FIG. 1(c) shows maximum angle on angular shortest path distance function (described below) between faces $t_1$ and $t_2$.

Due to the above shortcomings of the geodesic distance measure, a new distance function is introduced for use in the multi-scale decomposition process. The new distance function is computed with respect to the triangular faces of the model $\mathcal{M}\{t_1, \ldots, t_n\}$. Here, and in the rest of the patent application, n denotes the number of triangles in the model. The angular shortest path between two triangular faces $t_i$ and $t_j$ is defined to be the shortest path on the surface of the model which is computed in terms of angular difference between faces.

Figure 16:
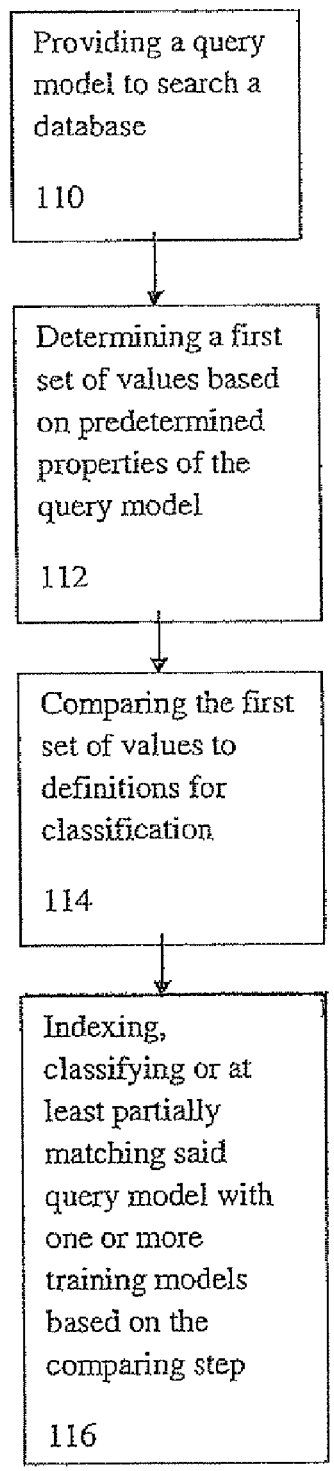
FIG. 16 is a flow-chart illustrating the steps of the method of searching a database.

FIG. 16 shows a flow-chart illustrating the steps of the method of searching a database. In step 110, a query model is provided to search a database. In step 112, a first set of values based on predetermined properties of the query model is determined. In step 114, the first set of values is compared to the definitions for classification. In step 116, the query model is indexed, classified or at least partially matched with one or more training models based on the comparing step.

FIG. 1(c) shows a maximum angle on the angular shortest path between the faces $t_1$ and $t_2$. Specifically, let $t_i \leadsto t_j$ denote the angular shortest path $(t_i, t_m, t_l, \ldots, t_j)$ between faces $t_i$ and $t_j$. And let $t_m \to t_l \in t_i \leadsto t_j$ denote two adjacent triangular faces $t_m$ and $t_l$ on the angular shortest path $t_i \leadsto t_j$. Then, the distance function is defined as:

$$D(t_i, t_j) = \max_{t_m \to t_l \in t_i \leadsto t_j} L(t_m, t_l). \tag{1}$$

Intuitively, distance $\mathcal{D}(t_i, t_j)$ is the maximum angle between adjacent faces on the angular shortest path between $t_i$ and $t_j$. The rationale behind such measure is to quantify the smoothness of the surface—a small angle between adjacent faces correspond to smooth surface.

Observe that by construction the matrix $\mathcal{D}_{\mathcal{M}} = [\mathcal{D}(t_i, t_j)]_{n \times n}$ is symmetric. Distance measure $\mathcal{D}$ is not a metric function, but it captures the geometric structure of the model $\mathcal{M}$. Such an angular distance measure has the same properties as the geodesic distance function used in the previous work. As a result, introduction of the new distance measure for decomposition does not violate any statements made in [10] and all of the theorems would still hold.

III. Decomposition Algorithm

Let $v_i$ be the $i^{th}$ row (or column) in $\mathcal{D}$. Then $v_i$ is an n-dimensional vector characterizing the distance structure of face $t_i$ in model $\mathcal{M}$. The problem of decomposing model $\mathcal{M}$ into its k most significant features $\mathcal{M}_1, \ldots, \mathcal{M}_k$ is closely related to k-dimensional subspace clustering (k-DSC). k-DSC and gives a set of distance vectors $v_i, \ldots, v_n$, where the objective is to find a k-dimensional subspace S that minimizes the quantity:

$$\sqrt{\sum_{1 \leq i \leq n} d(v_i, S)^2}, \tag{2}$$

where $d(v_i, S)$ corresponds to the smallest distance between $v_i$ and any member of $S$. In practice, if $S$ is given, then $\mathcal{M}_1, \ldots, \mathcal{M}_k$ can be computed using the principle components $\{c_1, \ldots, c_k\}$ of the k-dimensional subspace $S$[63]. These k vectors will also form a basis for $S$. Specifically, $t_i$ will belong to the feature $\mathcal{M}_j$ if the angle between $v_i$ and $c_j$ is the smallest among all basis vectors in $\{c_1, \ldots, c_k\}$, i.e., the triangular face $t_i$ that corresponds to the vector $v_i$ will belong to the feature vector $\mathcal{M}_j$ if the angle between $v_i$ and $c_j$ vectors is the smallest compared to all other basis vectors.

Singular value decomposition (SVD) clustering [63] is used to construct the subspace $S$, which is the optimal solution of k-DSC. First, observe that the symmetric matrix $\mathcal{D} \in \mathbb{R}^{n \times n}$ has an SVD-decomposition of the form:

$$\mathcal{D} = U\Sigma V^T \tag{3}$$

where $U, V \in \mathbb{R}^{n \times n}$ are orthogonal matrices and $$\Sigma = \text{Diag}(\sigma_1, \sigma_2, \ldots, \sigma_n), \tag{4}$$

with $\sigma_1 \geq \sigma_2 \geq \ldots \sigma_{n'} > 0$, $\sigma_{n'+1} = \ldots = \sigma_n = 0$, $n' \leq n$.

The order k compression matrix is defined as $\mathcal{D}^{(k)}$ of $\mathcal{D}$, for $k \leq n'$ as:

$$\mathcal{D}^{(k)} = U \text{Diag}(\sigma_1, \ldots, \sigma_k, 0, \ldots, 0) V^T.$$

Then, theorem 1 [follows from Eckart-Young Theorem [64]].

$$\|D - D^{(k)}\|^2 = \min_{rank(H) = k} \|D - H\|_2. \tag{6}$$

This states that matrix $D^{(k)}$ is the best approximation to $\mathcal{D}$ among all matrices of rank k. The set $S = \text{range}(D^{(k)})$ ($S$) is the range of matrix $D^{(k)}$, the subspace spanned by the columns of matrix ($D^{(k)}$) is the optimal solution to k-DSC problem.

Figure 2A:
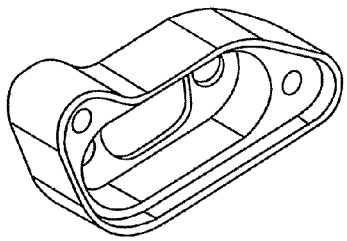
FIGS. 2a-2d illustrate results of applying FEATURE-DECOMPOSITION (M, k) to a model using different distance functions D for k=2.
Figure 2B:
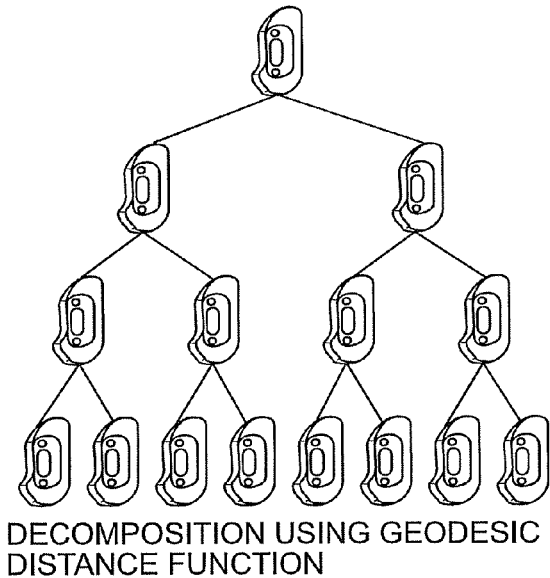
Figure 2C:
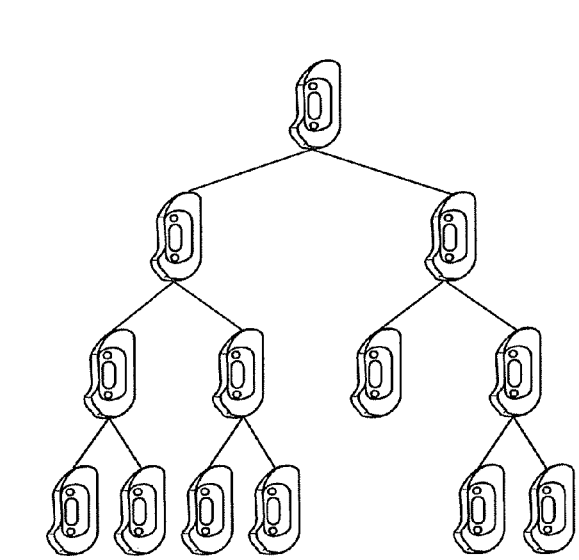
Figure 2D:
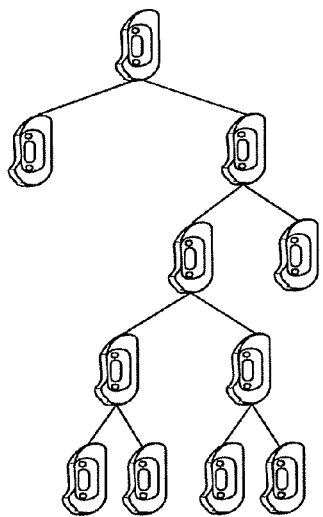

Algorithm 1 summarizes one phase of the scale-space decomposition of $S$ into its k most significant features, $S_1, \ldots, S_k$. Algorithm 1 returns the partitioning of $S$ by placing each face $t_i$ in $S$ into one of the partitions $S_j$, such that the angle between vector $t_i$ and basis vector $c_j$ corresponding to the partition $S_j$ is minimized. FIGS. 2b-2d show three decomposition trees of the model—using (b) geodesic distance, (c) angular shortest path and (d) maximum angle on angular shortest path measures. Note that the presented decomposition trees are not full and the leaf nodes of the trees may not correspond to the actual final features extracted from this model.

Algorithm 1 FEATURE-DECOMPOSITION($\mathcal{M}$, k)

1: Construct the distance matrix $\mathcal{D} \in \mathbb{R}^{n \times n}$.
2: Compute the SV D decomposition $\mathcal{D} = U\Sigma V^T$, with $\Sigma$ = Diag($\sigma_1, \sigma_2, \ldots, \sigma_n$).
3: Compute the order k compression matrix $\mathcal{D}^{(k)}$ = UDiag($\sigma_1, \ldots, \sigma_k, 0, \ldots, 0) V^T$.

-continued

Algorithm 1 FEATURE-DECOMPOSITION( $\mathcal{M}$, k)

4:     Let $c_j$ denote the $j^{th}$ column of $\mathcal{D}^{(k)}$, for j = 1,...,k, and form sub-feature $\mathcal{M}_j$ as the union of faces
       $t_i \in \mathcal{M}$ with $d(t_i, \mathcal{S}) = d(t_i, c_j)$.
5:     Return the set $\{\mathcal{M}_1, ..., \mathcal{M}_k\}$.

The bottleneck of Algorithm 1 is the $O(n^3)$ SVD decomposition, for a n×n, matrix. The polyhedral representation of a model provides a planar graph of a $2\mathcal{D}$ manifold. If only neighboring vertices are considered in the construction of the distance matrix $\mathcal{D}$, the number of non-zero entries in $\mathcal{D}$ would be at most 3n (due to planarity of the graph). Computing the SVD decomposition for sparse matrices is much faster and takes $O(mn)+O(mM(n))$ [65]. Where m is the maximum number of matrix-vector computations required and M(n) is the cost of matrix-vector computations of the form $\mathcal{D}x$, since $\mathcal{M}$ is a planner map and $\mathcal{D}$ is a sparse matrix. $M(n)=O(n)$ and $m=O(n)$.

IV. Controlling the Decomposition Process

Figure 4:
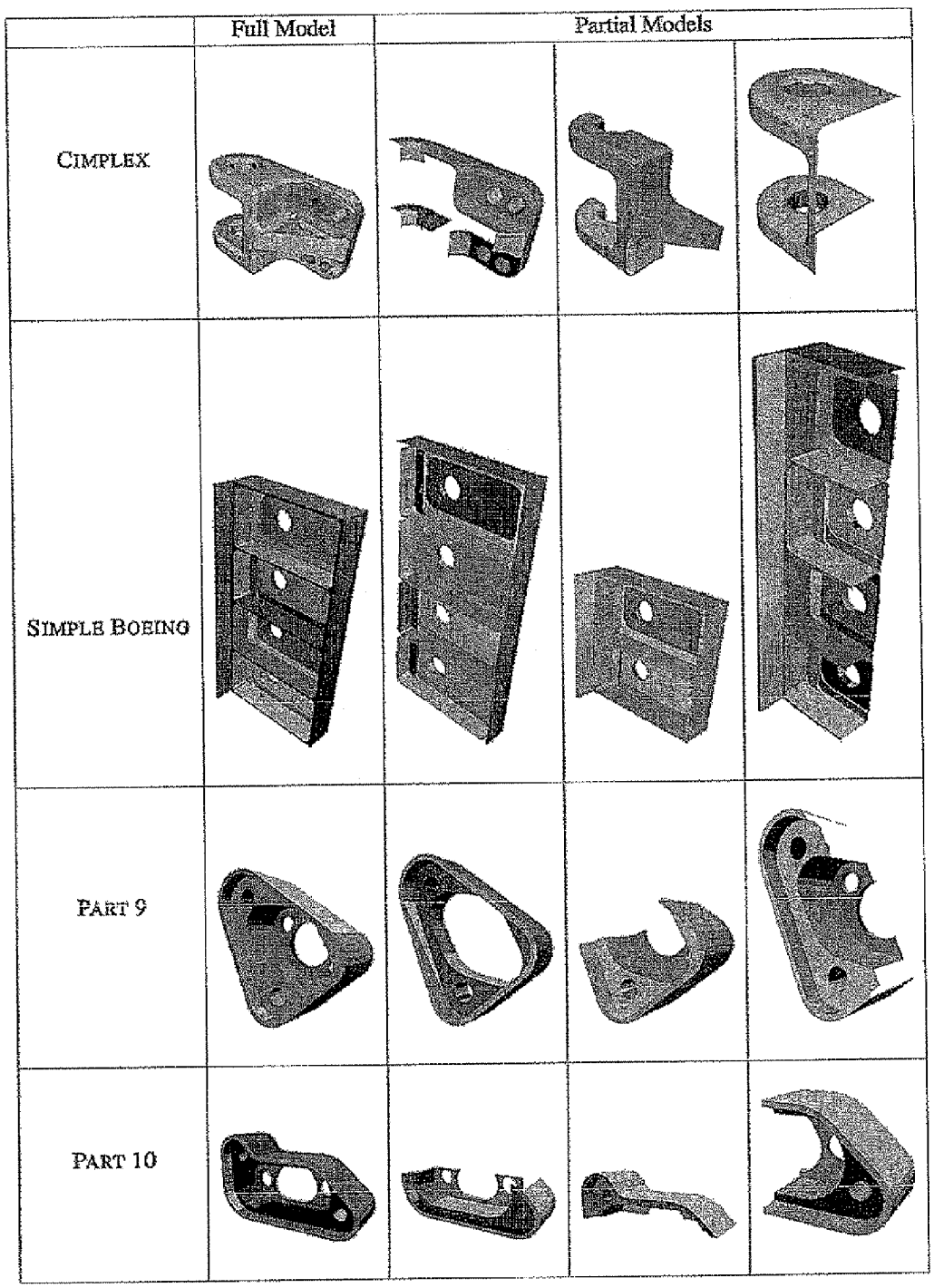
FIG. 4 illustrates extracted features from CAD models.

The decomposition process as previously presented does not allow for an explicit mechanism to stop the indefinite subdivision of a feature. Clearly, one could use a prescribed value to control the decomposition depth of the feature trees, i.e., the decomposition process will be stopped when a root branch in feature decomposition tree reaches a given depth. This section provides an overview of a mechanism that will control the feature decomposition. Intuitively, the use of this control mechanism will terminate the decomposition process only when all coherent features are extracted. FIG. 4 shows the results of decomposition process on selected CAD models, including partial ones.

Let $\mathcal{M}$ be the original model's face set. Assume in the decomposition process a feature $\mathcal{M}_l$ in $\mathcal{M}$ can be decomposed into sub-features $\mathcal{M}_2$ and $\mathcal{M}_3$ (e.g., without loss of generality assume that feature $\mathcal{M}_l$ is bisected). The decomposition of the feature $\mathcal{M}_l$ into sub-features $\mathcal{M}_2$ and $\mathcal{M}_3$ is said to be significant if the angular distance between components of $\mathcal{M}_2$ and $\mathcal{M}_3$ is large. Formally, this condition could be expressed as follows:

$$\forall t_i \in \mathcal{M}_2, t_j \in \mathcal{M}_3 \exists t_m \to t_i \epsilon t_i \leadsto t_j \text{ s.t.}$$

$$t_m \epsilon \mathcal{M}_2 \mathcal{M}_{t_l} \epsilon \wedge_3 \wedge \angle(t_m, t_l) = \mathcal{D}(t_i, t_j).$$

i.e., if the angular shortest path between $t_i \epsilon \mathcal{M}_2$ and $t_j \epsilon \mathcal{M}_3$ contains two faces $t_m$ and $t_l$ (from $\mathcal{M}_2$ and $\mathcal{M}_3$ respectively) with large angular distance, then $\mathcal{M}_1$ should be decomposed into $\mathcal{M}_2$ and $\mathcal{M}_3$. Intuitively, if $\mathcal{M}_1$ is smooth it should not be bisected any further. On the other hand, if the discrepancy between the neighboring triangles in $\mathcal{M}_1$ is significant, $\mathcal{M}_1$ should be bisected.

V. EXAMPLES

The feature extraction process was performed on a number of CAD models in polyhedral representation. These models were converted from ACIS format, which is exact representation format. As a result, all of the models have a nice structure (i.e., no missing faces).

Figures 3A, 3B:
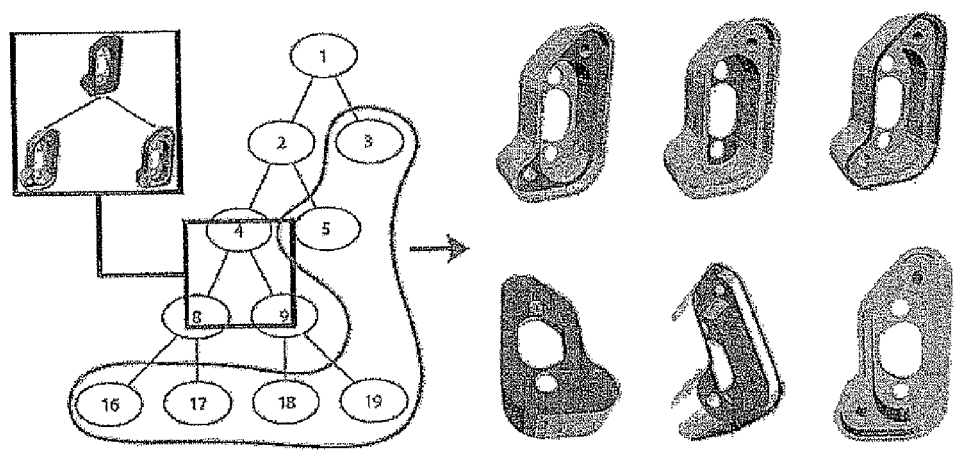
FIGS. 3a-3b illustrate a feature extraction process.

In the experiments, the qualities of features extracted were examined using the FEATURE-DECOMPOSITION ($\mathcal{M}$, k) algorithm. To accomplish this, FEATURE-DECOMPOSITION ($\mathcal{M}$, k) is recursively applied to each model for k=2. Once a decomposition tree is obtained, the last layer of the decomposition tree (leaf nodes) is said to be a set of extracted features. Note that the union of the features (leaf nodes) is equivalent to the surface of the entire model. Refer to FIGS. 3a-3b for an illustration of the feature extraction process. For illustrative purposes, only a subset of, extracted features is shown in FIG. 3(b). The features shown in FIG. 3(a) do not correspond to the leaf nodes in FIG. 3(b). The actual decomposition tree is quite large for this model.

1. Feature Decomposition on CAD Data

FIG. 4 shows extracted features for several models. These images are presented in order to illustrate the type of features that the technique can extract. Each feature corresponds to a relatively smooth surface on the model. If there is a significant angular difference on the surface, then it gets decomposed into separate features. Any closed smooth surfaces (i.e., hole) are decomposed into two (i.e., hole) or more (i.e., surface is concave) features.

In addition, partial data from these models was created. Each model was intersected with several planes and only a part of the model (on one side of the plane) was saved. As a result, a number of partial objects were obtained which enabled analysis of the performance of the FEATURE-DECOMPOSITION ($\mathcal{M}$, k) algorithm on the models where only partial data is available. Illustrations of extracted features are found in FIG. 4. For a typical CAD model, scale-space feature decomposition with max-angle distance measurement produces over 150 features. Pictures of entire feature sets were omitted for the sake of space.

2. Feature Decomposition on Noisy Data

Figure 5:
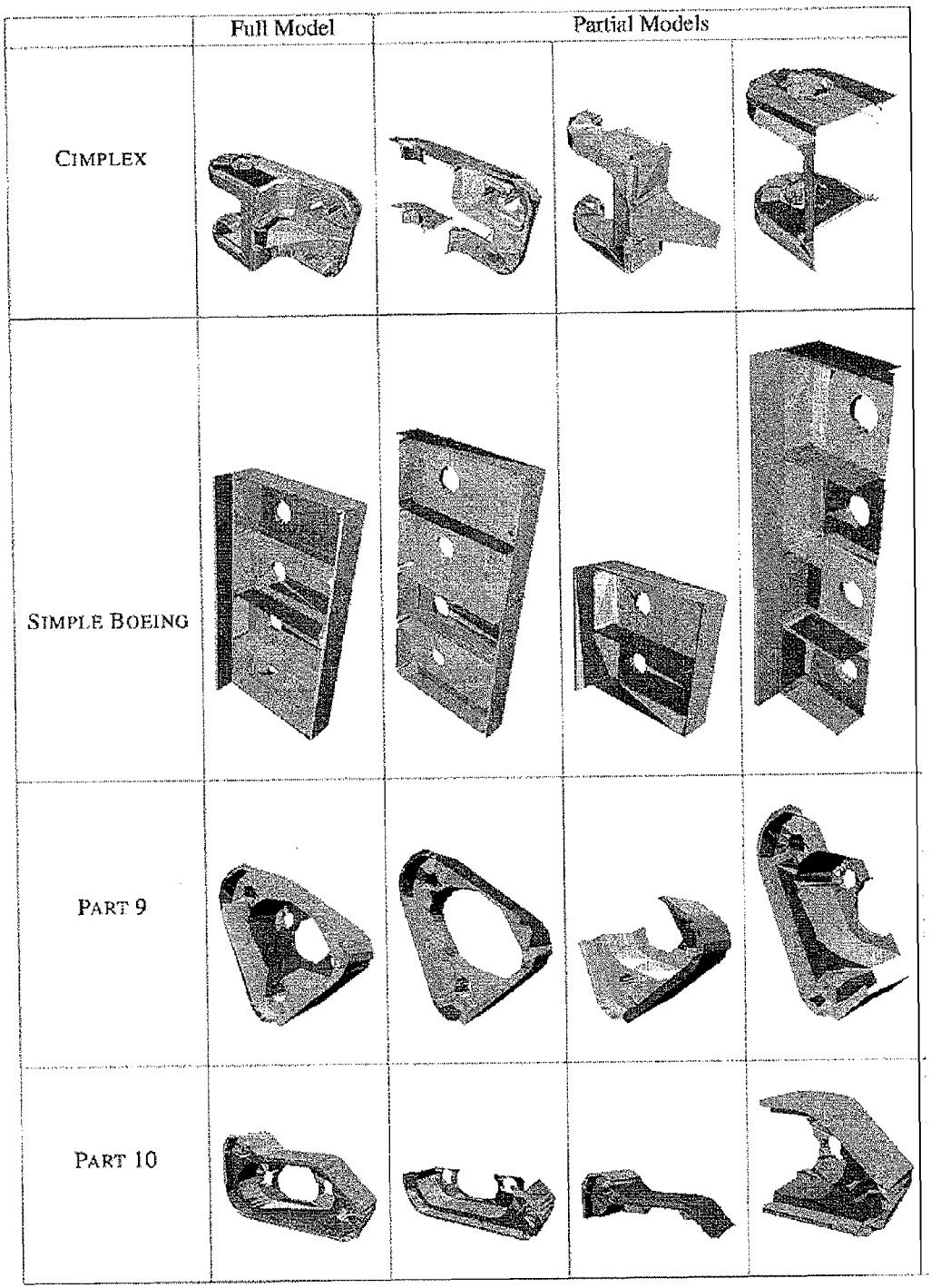
FIG. 5 illustrates extracted features from CAD models with 1% Gaussian noise applied to each point of the model.

In order to simulate small perturbations produced from capturing the object using 3D laser scan, Gaussian noise was applied to each point of the models presented in the last section. Gaussian Noise with standard deviation of 1% and 2% from the standard deviation of all points in the model was used. Then the features were extracted using the FEATURE-DECOMPOSITION ($\mathcal{M}$, k) algorithm. The illustrations of the extracted features can be found in FIGS. 5 and 6. Similar to the CAD models presented above, partial models for this data set were generated. Note that it is possible for separate features to be assigned visually similar shads, making them appear to be the same features.

3. Feature Decomposition on Acquired Models

Figures 7A, 7B:
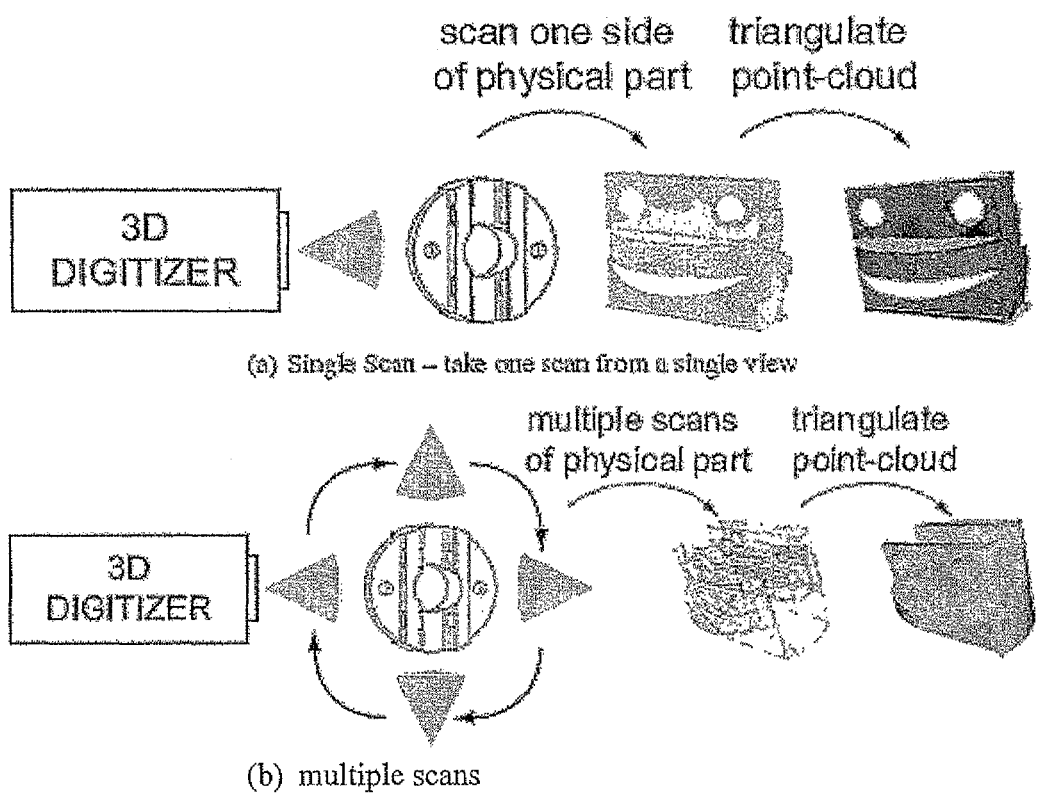
FIGS. 7a-7b illustrate acquisition processes where case (a) is substantially more difficult than case (b).

It has been established that the feature extraction procedure allows relevant subsets of a model that reflect the complexity of its 3D structure to be obtained. The next experiment was aimed at assessing whether the technique is capable of handling models that were obtained using a 3D digitizer—a full 3D view (FIG. 7(b)) and a partial 3D view (FIG. 7(a)) of 3D objects. Such data is known to be very noisy, often with broken connectivity and missing faces. Ideally, one would like to be able to take a single scan of a 3D CAD model, decompose it into features, and select models from the database that contain the same feature arrangements. Three CAD parts were used to create six 3D models—full and partial (one scan) for each CAD part. Once the point clouds were obtained, they were faceted, and features were extracted using the FEATURE-DECOMPOSITION ($\mathcal{M}$, k) algorithm.

Figure 8:
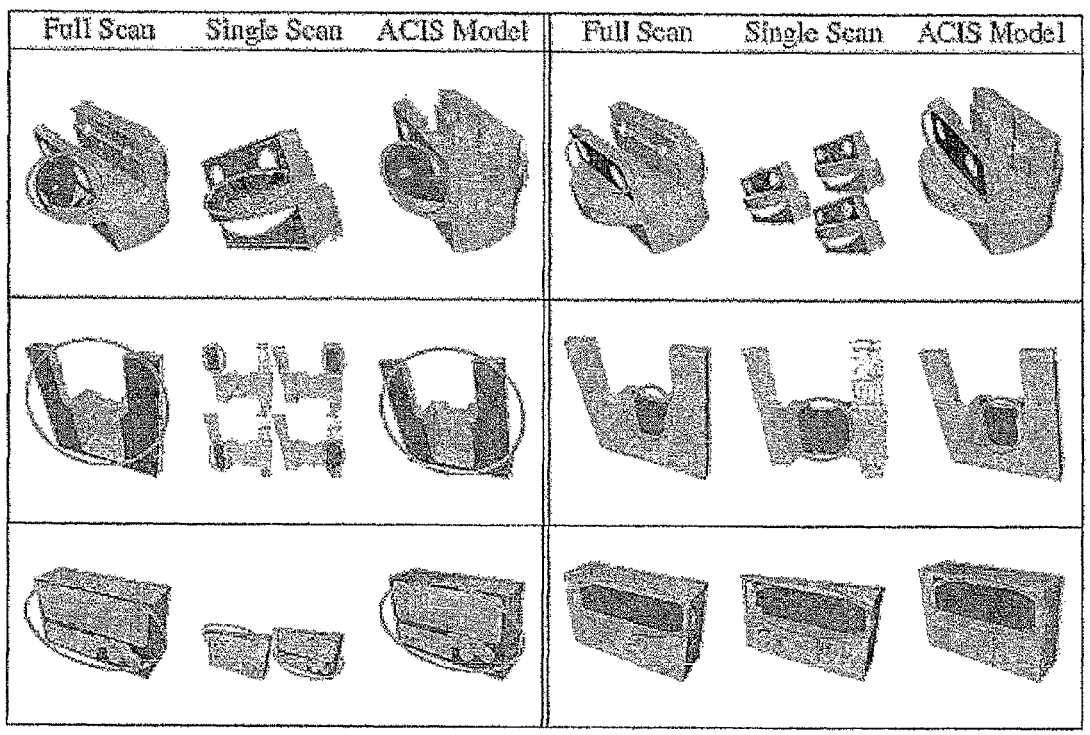
FIG. 8 illustrates correspondence of two selected extracted features for the full scan models, single scan models and models obtained from exact representation (ACIS model).

FIG. 8 shows correspondence between extracted features for fully and partially scanned models as well as models obtained from exact representations. Note that in some cases one feature from one model (i.e., full scan) can correspond to multiple features from another model (i.e., single scan).

4. Matching Experiment

In order to test whether features extracted using the scale-space technique with max-angle distance measurement can be used in retrieval of solid models, the following matching experiment was conducted. Three retrieval techniques were used in evaluation: Reeb Graph, original scale-space and max-angle scale-space.

The Reeb Graph based technique was introduced by Hilaga et al. [31]. This technique was designed for shape models and is based on identifying certain regions of a model (i.e., feature) and combining them into a hierarchical graph structure. Then, a graph matching technique is used to obtain similarity values for corresponding models. This approach performs very well if the overall gross shapes of the models are similar.

The original scale-space technique used geodesic distance for the distance function. By "max-angle scale-space," is meant the feature extraction approach described herein. Although this approach does not have a matching technique specifically designed for it, a simple sub-graph isomorphism approach was employed to assess the similarity of constructed feature graphs. All three techniques were evaluated on one dataset of solid models which is described below. In order to illustrate the results of the experiment, precision-recall plots were constructed as will be described below.

A. Matching Approach

For simplicity, a variation on a classical sub-graph isomorphism algorithm is used to assess the similarity of the feature adjacency graphs: leaf nodes (features) in the decomposition tree become nodes in the graph, and edges indicate adjacency of the features on the surface of the model. A hill-climbing algorithm with random restarts was used in the implementation of the sub-graph isomorphism technique. A largest common subgraph algorithm, as described in [6, 4, 5, 66], was used in the implementation of the subgraph isomorphism technique. This well-known approach to graph matching was used to show that the feature graphs constructed using max-angle distance measurement carry relevant information about the structure of the models and could be used to assess similarities between 3D CAD models. In reality, a more sophisticated graph matching algorithm should be used to yield even higher accuracy in matching. As the experimental results suggest, such a sophisticated graph matching algorithm should be able to allow many-to-many matching of the nodes within the feature graphs.

B. Dataset

Figure 9:
FIG. 9 illustrates examples of the models from the functional classification dataset.

The dataset used in this experiment consists of seven groups of models. Seventy models are hand classified by their role in mechanical systems. For instance, brackets are overhanging members that project from a structure and are usually designed to support a vertical load or to strengthen an angle. Linkage arms are motion-transferring components from the spectrometer assembly. Nuts, screws, and blots are commonly used fasteners. FIG. 9 shows a sample of this dataset, and Table 1 shows a brief summary of this dataset.

TABLE 1

Statistics of Functional Dataset

|  | #Models | Avg. #Faces | Avg. #Polygons |
|---|---|---|---|
| Brackets | 9 | 45 | 911 |
| Gears | 12 | 169 | 4045 |
| Housings | 6 | 218 | 5141 |
| Linkage Arms | 13 | 30 | 1282 |
| Nuts | 7 | 8 | 518 |
| Screws and Blots | 18 | 15 | 431 |
| Springs | 5 | 161 | 7933 |
| Total | 70 | | |

TABLE 1-continued

Statistics of Functional Dataset

|  | Avg. SAT size | Avg. STEP size | Avg. VRML size |
|---|---|---|---|
| Brackets | 56 KB | 100 KB | 41 KB |
| Gears | 458 KB | 525 KB | 191 KB |
| Housings | 300 KB | 450 KB | 250 KB |
| Linkage Arms | 62 KB | 100 KB | 57 KB |
| Nuts | 13 KB | 19 KB | 31 KB |
| Screws and Blots | 18 KB | 30 KB | 21 KB |
| Springs | 620 KB | 960 KB | 440 KB |

C. Precision-Recall Measure

The performance of various retrieval techniques was evaluated by the k-nearest neighbor classification (kNN), and conventional recall and precision measures for evaluating information retrieval systems. The recall and precision values are computed at different threshold values of parameter k using the following formulas:

$$recall = \frac{\text{Retrieved and Relevant models}}{\text{Relevant models}}$$

$$precision = \frac{\text{Retrieved and Relevant models}}{\text{Retrieved models}}$$

The k NN classification labels a query model with the categories of its k closest neighbors, where k is the threshold for classification. The numbers of labeled categories potentially increase and decrease with respect to k.

Under this experimental setting, the factors of recall and precision computation become:

Relevant models: The number of models that fall in to same category as the query model.

Retrieved models: The number of models returned by a query.

Retrieved and Relevant models: The number of models returned and that fell into the same category as the query model.

Recall and precision values were first computed per model at different k values. For each k, the arithmetic mean of the recall and precision across all models in a dataset was used as a representative value. To illustrate the results, precision is plotted against recall on different datasets and comparison techniques.

Ideally, a retrieval system should retrieve as many relevant models as possible, both high precision as well as high recall are desirable. A precision-recall graph plots precision against recall. It shows the trade-off between precision and recall. Trying to increase recall, typically, introduces more irrelevant models into the retrieved set, thereby reducing precision. Rightward and upward precision-recall curves indicate better performance.

D. Matching Results

Figure 10:
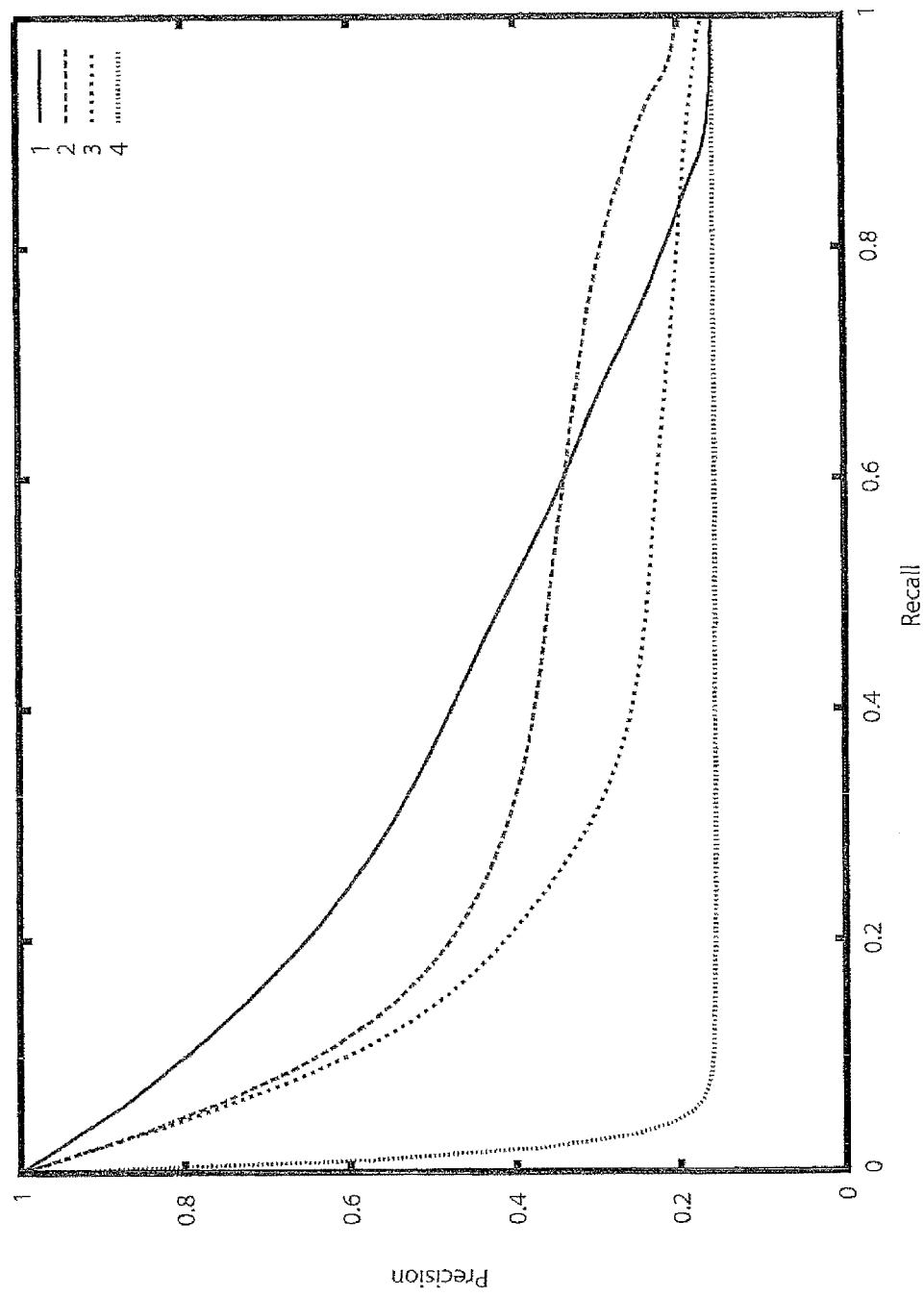
FIG. 10 is a precision-recall graph for retrieval experiments using various techniques.

The precision-recall graphs for the dataset can be found in FIG. 10. The lines 1 through 4 are:

1. A Reeb graph technique;
2. A scale-space technique with the max-angle distance function and simple sub-graph isomorphism for matching;
3. Original scale-space technique with geodesic distance function; and
4. Random retrieval technique.

The random retrieval technique was simulated by choosing all models randomly. It appears that the Reeb graph technique performs relatively better than both scale-space approaches, while scale-space technique with max-angle distance function outperforms the original scale-space technique for this dataset. The results of this experiment show that the use of a scale-space feature extraction technique with max-angle distance function results in meaningful decomposition that could potentially be used for matching of 3D CAD data.

E. Fidelity Experiments

Due to the approximated nature of shape models (polyhedral representation), the fidelity of shape models depends on the granularity of the faceting process. In order to measure the effects of fidelity variations on the feature extraction technique, a set of the following experiments was performed.

F. Variable Fidelity Dataset

A subset of models from the functional classification dataset (FIG. 9) was chosen for the fidelity experiments. A total of 40 CAD models classified by part families were used. Each of them was faceted by ACIS for three instances with different normal tolerances (50, 15, 5), resulting in 120 models. FIG. 11 shows the mesh of an example model under different fidelity settings. Lowering the normal tolerance will cause the faceting component to approximate a parametric surface with more polygons, hence increasing the fidelity of the resulting shape model. Ideally, a robust retrieval system should be indifferent to fidelity variations of meshes. Table 2 shows a brief summary of this dataset

TABLE 2

Statistics of Variable Fidelity Dataset.

|      | Nu  | Average | Average VRML |
|------|-----|---------|--------------|
| High | 40  | 18416   | 850 KB       |
|      | 40  | 5908    | 275 KB       |
| Tota | 120 |         |              |

G. Fidelity Experiment Using Original Scale-Space Technique

Figure 12A:
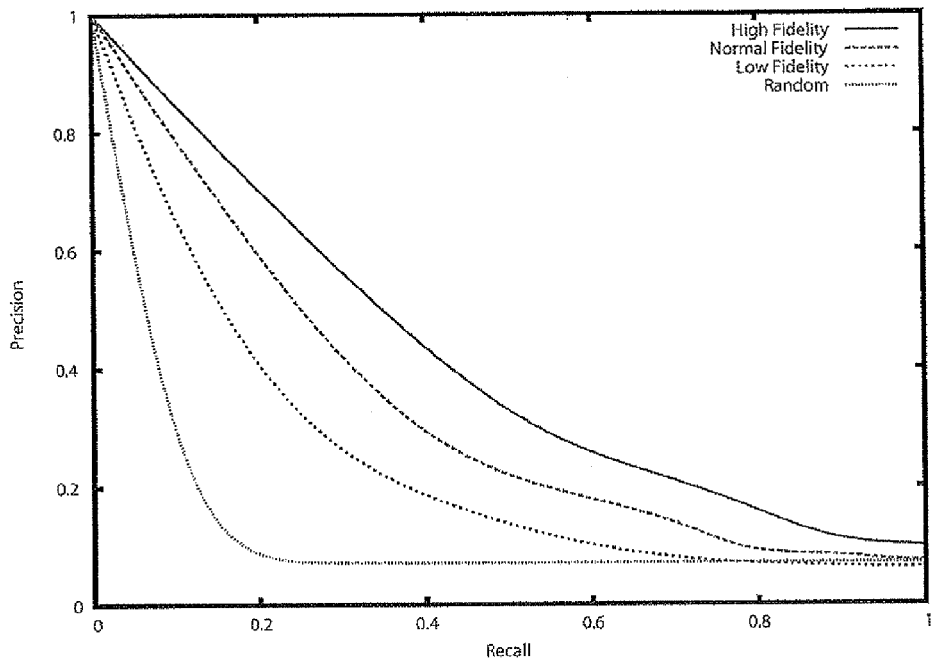
FIGS. 12a-12b illustrate precision-recall graphs of variable fidelity data sets.

The precision-recall performance of the original scale-space technique (i.e., with a geodesic distance function) was measured on the variable fidelity dataset. A precision-recall plot was constructed for each fidelity setting (low, normal, high). FIG. 12(a) presents precision-recall plots for various fidelity settings using the original scale-space technique.

The experimental results show that the retrieval performance of the original scale-Space technique improved as the mesh fidelity increased. This behavior is largely due to the fact that geodesic distance measure is affected by the mesh fidelity. As the mesh fidelity increases, the distance measure is calculated more precisely and, as a result, improves "quality" of extracted features. This results in more accurate retrieval of CAD data.

H. Fidelity Experiment Using Multi-Scale Technique with Max-Angle Distance

Function

Figure 12B:
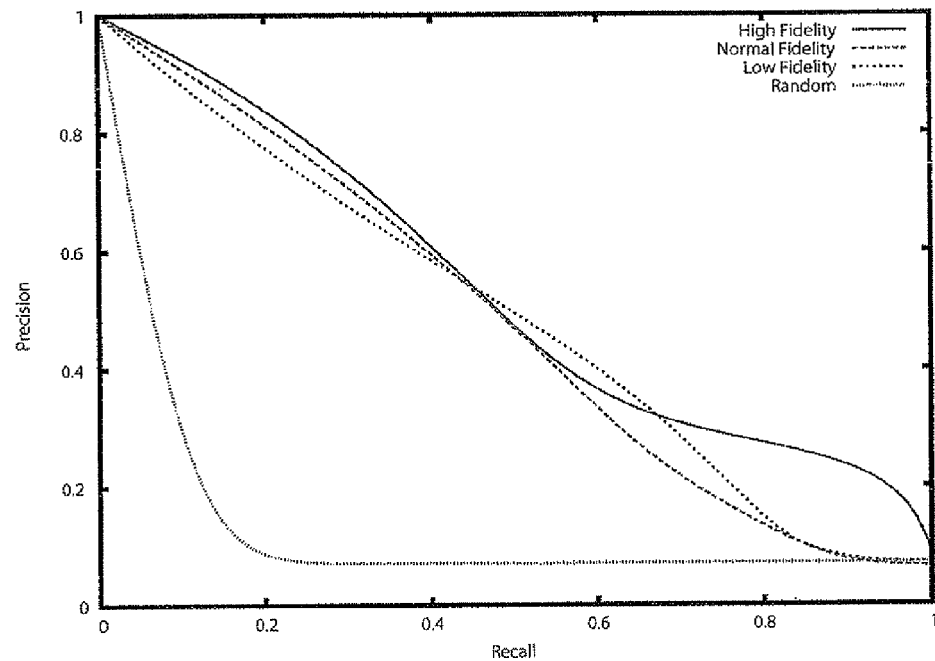

Just like in the experiment for the original scale-space technique, precision-recall plots for each fidelity setting were constructed using a scale-space retrieval technique with max-angle distance function. In this example, the simple sub-graph isomorphism algorithm is used for matching. FIG. 12(b) presents precision-recall plots for various fidelity settings using a scale-space technique with max-angle distance function.

The results suggest that a scale-space technique with max-angle distance function is relatively invariant to the mesh fidelity. This is due to the nature of the distance measure used in feature extraction. Since distance measure is angle based, the extracted features are preserved across various fidelity settings. Indeed, increasing the mesh fidelity normally affects smooth or flat surfaces, which are already being segmented as separate features. Furthermore, various fidelity settings do not affect right or rather large angles between surfaces on the mesh models, which also preserve feature extracted using the scale-space technique with max-angle distance function.

I. Partial Matching

This experiment was designed to test whether a simple sub-graph isomorphism can yield satisfactory retrieval results on scanned and partial data. A total of nine models were used as query models for this experiment. The query models correspond to three actual physical parts (displayed in FIG. 13). For each physical part, three various 3D models were obtained—full scan and single scan models, and partial models in ACIS format (exact representation). Removing some features from the full models created the partial models obtained from exact representations, such that they would resemble single scan models of the corresponding physical parts.

The database contained models from the dataset used in the matching experiment and full CAD models that correspond to the query models. All of the objects in the database were converted from the ACIS format into polyhedral representations. For each query model, k closest neighbors from the database were retrieved. The experimental results for k=5 are presented in FIG. 13.

From FIG. 13, one may conclude that for only one physical part (the one in the middle), the desirable (correct) model was among five returned models. For this physical part, for every variation of the models, the desirable model was among the returned ones. Furthermore, i f k is set to 10, then 5 (out of 9) queries returned the correct model. Increasing k to 15, results in 7 (out of 9) correct queries, while k=20 returned the desirable model among the returned ones for 9 (out of 9) queries.

The unsatisfactory performance of the max-angle scale-space decomposition technique with matching using sub-graph isomorphism can be explained as follows. The model that resulted in correct queries for k=5 (correct model was among returned ones) has a topologically distinctive feature graph. As a result, the sub-graph isomorphism algorithm was able to pick the correct model among all of the models in the database. Further, partial data resulted in partial feature graphs and, as a result, the distance between a partial model and a full model became large enough to diminish the retrieval capabilities. Lastly, when scale-space decomposition is applied to scanned data, the perturbations may contribute to the extracted features (i.e., perturbations become extracted features). This issue can clearly affect performance of the sub-graph isomorphism on feature graphs.

i. Handling Acquired Models

When a 3D model of a CAD artifact, or any object (FIG. 7) is scanned, many irregularities are introduced. First of all, scanning produces a point cloud; and turning such point clouds into reliable, watertight, meshes is a very active research problem. Further, "noise" can be introduced in a number of ways. First, noise can be introduced by the scanner accuracy, where points may be sampled in such a way as to deviate from the nominal geometry. Second, there will be gaps and voids, such as are found on the inside surfaces of holes that are either occluded or are parallel to the scanning laser's beam.

There are two ways to approach this problem. First, one could design techniques based on the assumption that the model is completed though some automated process or using vast amounts of human editing. This could result in a watertight model; or at least one that is suitable for visualization purposes. The second approach is to design techniques to work off of the partial data (FIG. 7(a)).

ii. Efficient Matching Algorithms

Figure 14:
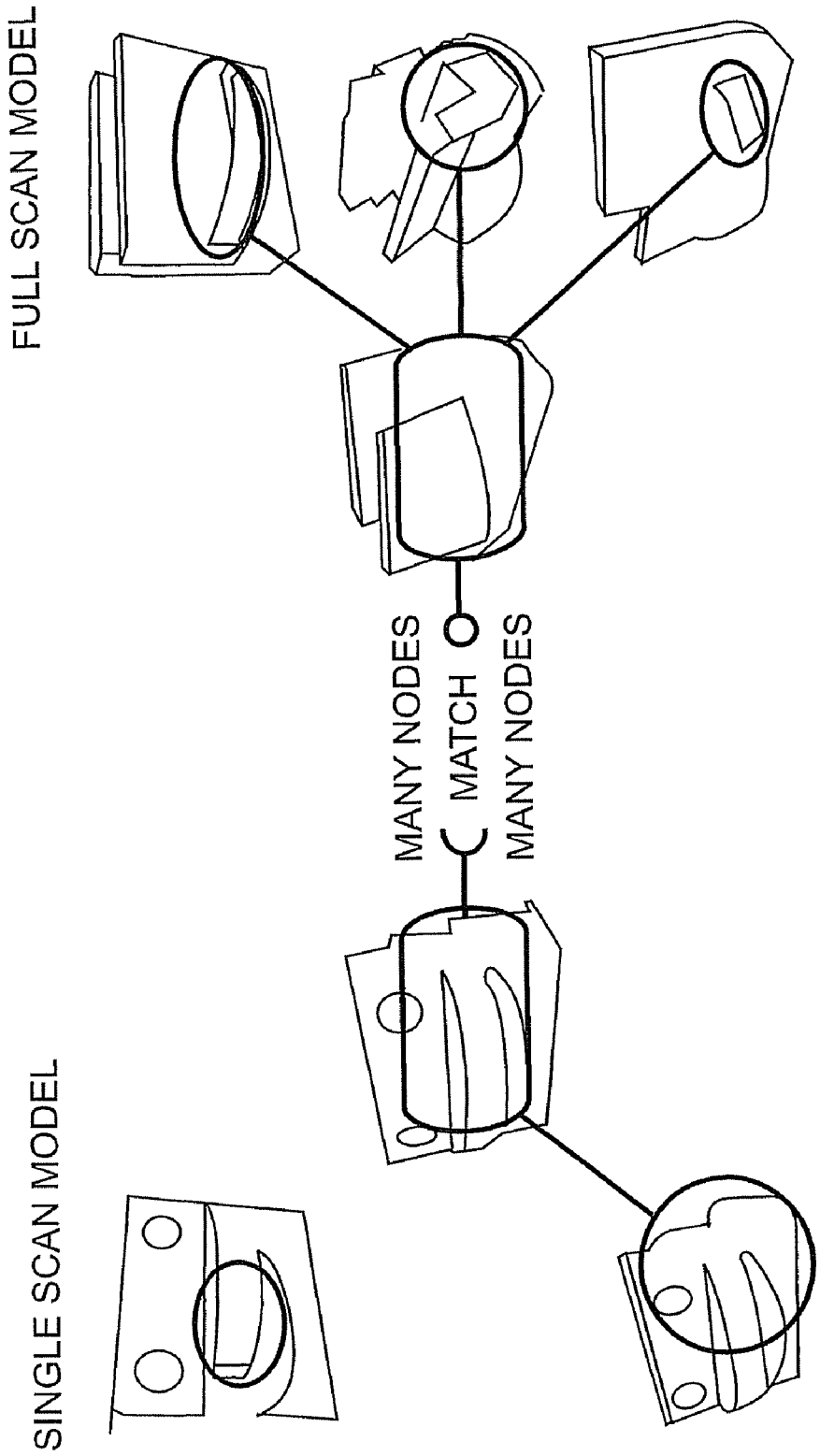
FIG. 14 illustrates many-to-many matching.

Given that input data will not be of identical quality to the data in the database, features may not get segmented the same way across models with these different underlying representations. As shown in FIG. 14, features may get divided in to several features. Features from single scan model (on the left, shown in red) may not match features from a full scan model (on the right, shown in red), while the unions of the features (shown in green) may match. The way to address this is to develop algorithms for many-to-many matching. For instance, a matching technique with such properties could potentially be derived from a conventional many-to-many matching algorithm [47]. Efficiency is also a concern, if these algorithms are to be used with the National Design Repository database or in other interactive settings.

iii. Similarity Measures

Figure 15:
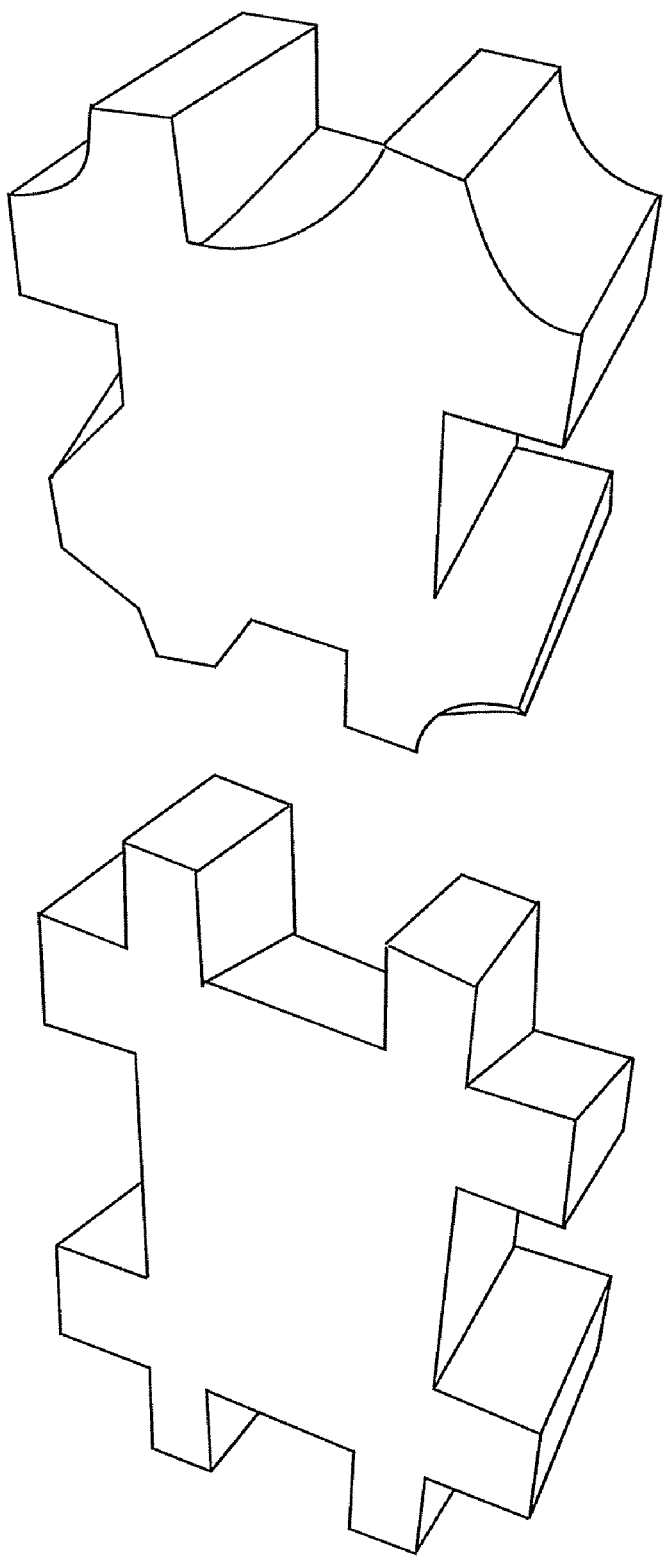
FIG. 15 illustrates the results of matching between GOODPART and BADPART, with matched features (leafs of decomposition trees) having similar shades.

Similarity measures need to be different in the presence of partial data and many to-many feature correspondences. Previous work [10] successfully used a distance function that was based on a numerical value for each pair of features. These values were based on area and Euclidean distance measurements within features. FIG. 15 shows a sample view of two models with matched regions. Depending on the data, exact correspondences may not be possible and that even segmentations into single features may rarely correspond with each other. Feature trees are obtained for each model using the FEATURE DECOMPOSITION ($\mathcal{M}$, k) with geodesic distance function.

iv. Semantically Meaningful Features

Scale-space techniques may be used to extract features that more closely resemble traditional CAD features (i.e., such as those found in the ISO 10303 STEP AP 224 standard); and to exploit the possibility of using scale-space features as signatures for indexing purposes. In summary, a computationally practical approach has been introduced based on scale-space decomposition to automatically segment 3D models in polyhedral representation into features that could be used for indexing, classification and matching. The decomposition is based on the local surface structure of a model. As a result similar features can be extracted in the presence of partial model information and noisy data. In this way, the technique has been shown to consistently segment partial 3D views, noisy geometry and the data (both partial and noisy) acquired by 3D laser range scanners.

One of the significant aspects of this invention is to unite the notion of "feature" from the computer vision and graphics literature with the "features" of CAD/CAM. The specific measurement function behind the concept of features in this invention is highly tuned to the efficient identification of shape and topological categories. In one application, features obtained using this approach could be different from traditional CAD features and may be used to establish partial similarities between CAD models in polyhedral representation. The scale-space technique can be parameterized using different measurement functions, enabling it to generate a variety of useful segmentations, including those that have semantic relevance to engineering and manufacturing properties. Through experiments, locality-based feature representation was shown to have useful capabilities that can be employed for 3D matching purposes, including partial matching. Furthermore, the examples indicate that the scale-space decomposition technique can potentially be used on 3D models (in particular, partial models) generated from 3D data acquisition devices, such as laser range scanners.

Scale-space techniques subsume all existing approaches to feature identification by parameterizing the decomposition of the surface on a model as a distance measure function. The concept of the measure function is highly generalizable, implying that all one needs to do is identify the measure function intrinsic to the class of features of interest and provide it as a parameter to the scale-space algorithm.

References

[1] Lindeberg, T., 1990. "Scale-space for discrete signals," IEEE Trans. Pattern Anal. Mach. Intell., 12 (3), pp. 234-254.

[2] Han, J.-H., Regli, W. C., and Pratt, M. J., 2000. "Algorithms for feature recognition from solid models: A status report," IEEE Transactions on Robotics and Automation, 16 (6) [December], pp. 782-796.

[3] Shah, J., Anderson, D., Kim, Y. S., and Joshi, S., 2001. "A discourse on geometric feature recognition from cad models," ASME Transactions, the Journal of Computer and Information Science in Engineering, 1 (1) [March], pp. 41-51.

[4] Cicirello, V., and Regli, W., 2001. "Machining feature-based comparisons of mechanical parts," In International Conference on Shape Modeling and Applications, ACM SIGGRAPH, the Computer Graphics Society and EUROGRAPHICS, IEEE Computer Society Press, pp. 176-187.

[5] Cicirello, V., and Regli, W. C., 2002. "An approach to a feature-based comparison of solid models of machined parts," Artificial Intelligence for Engineering Design, Analysis, and Manufacturing (AIEDAM), 16 (5) [November], pp. 385-399.

[6] Ullmann, J. R., 1976, "An algorithm for subgraph isomorphism," *J. Assoc. Comput. Mach.*, 23, pp. 31-42.

[7] Iyer, N., Jayanti, S., Lou, K., Kalyanaraman, Y., and Ramani, K., 2005, "Three dimensional shape searching: State-of-the-art review and future trends," *Journal of Computing and Information Science in Engineering. In press.*

[8] Veltkamp, R. C., and Tangelder, J. W., 2004, "A survey of content based 3d shape retrieval methods," In Shape Modeling Applications.

[9] Cardone, A., Gupta, S. K., and Karnik, M., 2003, "A survey of shape similarity assessment algorithms for product design and manufacturing applications," *Journal of Computing and Information Science in Engineering*, 3 [June], pp. 109-118.

[10] Bespalov, D., Shokoufandeh, A., and Regli, W. C., 2003, "Scale-space representation of 3d models and topological matching," In Symposium on Solid Modeling and Applications, pp. 208-215.

[11] Shapiro, L. G., and Haralick, R. M., 1981, "Structural descriptions and inexact matching," IEEE Transactions on Pattern Analysis and Machine Intelligence, 3 (5), pp. 504-519.

[12] Lamdan, Y., Schwartz, J. T., and Wolfson, H. J., 1990, "Affine invariant model-based object recognition," IEEE Transactions on Pattern Analysis and Machine Intelligence, 12 (5), pp. 578-598.

[13] Wolfson, H. J., 1990, "On curve matching," IEEE Transactions on Pattern Analysis and Machine Intelligence, 12 (5), pp. 483-489.

[14] Lamdan, Y., and Wolfson, H. J., 1988, "Geometric hashing: a general and efficient model-based recognition scheme." In Second International Conference on Computer Vision, pp. 238-249.

[15] Thompson, W. B., Riesenfeld, R. F., and Owen, J. C., 1996. "Determining the similarity of geometric models." In Proceedings of the ARPA Image Understanding Workshop.

[16] W. B. Thompson, Owen, J., de St. Germain, H., Stark Jr., S., and Henderson, T., 1999. "Feature-based reverse engineering of mechanical parts." IEEE Transactions on Robotics and Automation, 12 (1) [Feburary], pp. 57-66.

[17] Gupta, A., and Jain, R., 1997, "Visual information retrieval," Communications of the ACM, 40 (5) [May], pp. 7 1-79.

[18] Talukder, A., and Casasent, D., 1998, "Nonlinear features for classification and pose estimation of machined parts from single views," In Proc. of the SPIE, Vol. 3522, SPIE, pp. 16-27.

[19] Sipe, M., and Casasent, D., 1999, "Global feature space neural network for active object recognition," In Int'l Joint Conference on Neural Networks.

[20] Shokoufandeh, A., Marsic, I., and Dickinson, S., 1999, "View-based object recognition using saliency maps," Image and Vision Computing, 17, pp. 445-460.

[21] Murase, H., and Nayar, S., 1995, "Visual learning and recognition of 3-D objects from appearance," International Journal of Computer Vision, 14, pp. 5-24.

[22] Sossa, H., and Horaud, R., 1992, "Model indexing: The graph-hashing approach," In Proceedings, IEEE CVPR, pp. 811-814.

[23] Sengupta, K., and Boyer, K., 1996, "Using spectral features for modelbase partitioning," In Proceedings, International Conference on Pattern Recognition.

[24] Shapiro, L., and Haralick, R., 1981, "Structural descriptions and inexact matching," IEEE Transactions on Pattern Analysis and Machine Intelligence, pp. 504-519.

[25] Eshera, M., and Fu, K., 1986, "An image understanding system using attributed relational graphs for image analysis," IEEE Transactions on Pattern Analysis and Machine Intelligence, pp. 604-618.

[26] Pelillo, M., Siddiqi, K., and Zucker, S. W., 1998, "Matching hierarchical structures using association graphs," In Fifth European Conference on Computer Vision, vol. 2, pp. 3-16.

[27] S. Tirthapura, D. Sharvit, P., and B. B. Kimia, 1998, "Indexing based on edit-distance matching of shape graphs," In SPIE Proceedings on Multimedia Storage and Archiving Systems III, pp. 25-36.

[28] Zhang, K., Wang, J. T. L., and Shasha, D., 1995, "On the editing distance between undirected acyclic graphs and related problems," In Proceedings of the 6th Annual Symposium on Combinatorial Pattern Matching, Springer-Verlag, Berlin, pp. 395-407.

[29] Zhang, K., Shasha, D., and Wang, J. T.-L., 1994, "Approximate tree matching in the presence of variable length don't cares," J. Algorithms, 16 (1), pp. 33-66.

[30] Osada, R., Funkhouser, T., Chazelle, B., and Dobkin, D., 2002, "Shape distributions," ACM Transactions on Graphics, 21 (4) [October], pp. 807-832.

[31] Hilaga, M., Shinagawa, Y., Kohmura, T., and Kunii, T. L., 2001, "Topology matching for fully automatic similarity estimation of 3d shapes," In SIGGRAPH, ACM, ACM Press, pp. 203-212.

[32] Tung, T., and Schmitt, F., 2004, "Augmented reeb graphs for content-based retrieval of 3d mesh models," In Shape Modeling Applications.

[33] Kazhdan, M., Funkhouser, T., and Rusinkiewicz, S., 2003, "Rotation invariant spherical harmonic representation of 3d shape descriptors," In Eurographics/ACM SIGGRAPH symposium on Geometry processing, Eurographics Association, pp. 156-164.

[34] Novotni, M., and Klein, R., 2004, "Shape retrieval using 3d zernike descriptors," Computer Aided Design, 36 (11) [September], pp. 1047-1062.

[35] Kazhdan, M., Chazelle, B., Dobkin, D., Funkhouser, T., and Rusinkiewicz, S., 2003, "A reflective symmetry descriptor for 3d models," Algorithmica, 38 (2) [November], pp. 201-225.

[36] Kazhdan, M., Funkhouser, T., and Rusinkiewicz, S., 2004, "Shape matching and anisotropy," ACM Transactions on Graphics (SIGGRAPH) [August].

[37] Shilane, P., Min, P., Kazhdan, M., and Funkhouser, T., 2004, "The Princeton Shape Benchmark," In Shape Modeling Applications, IEEE Computer Society Press, pp. 167-180.

[38] Shah, J. J., and M antyl a, M., 1995, Parametric and Feature-based CAD/CAM, John Wiley and Sons, Inc., New York, N.Y. ISBN 0-471-00214-3.

[39] Ji, Q., and Marefat, M. M., 1997, "Machine interpretation of cad data for manufacturing applications," Computing Surveys, 29 (3) [September], pp. 264-311.

[40] Allada, V., and Anand, S., 1995, "Feature-based modeling approaches for integrated manufacturing: State-of-the-art survey and future research directions," International Journal of Computer Integrated Manufacturing, 8 (6), pp. 411-440.

[41] Kyprianou, L. K., 1980, Shape Classification in Computer Aided Design. PhD thesis, Christ College, University of Cambridge, Cambridge, United Kingdom, July.

[42] Snead, C. S., 1989, Group Technology: Foundations for Competitive Manufacturing, Van Nostrand Reinhold, New York.

[43] Ames, A. L., 1991, "Production ready feature recognition based automatic group technology part coding," In Symposium on Solid Modeling Foundations and CAD/CAM Applications, J. Rossignac and J. Turner, Eds., ACM SIGGRAPH, ACM Press, pp. 161-169.

[44] Shah, J. J., and Bhatnagar, A., 1989, "Group technology classification from feature-based geometric models," Manufacturing Review, 2 (3), pp. 204-213.

[45] Ham, I., Marion, D., and Rubinovich, J., 1986, "Developing a group technology coding and classification scheme," Industrial Engineering, 18 (7), pp. 90-97.

[46] Funkhouser, T., Kazhdan, M., Shilane, P., Min, P., Kiefer, W., Tal, A., Rusinkiewicz, S., and Dobkin, D., 2004, "Modeling by example," In SIGGRAPH, ACM.

[47] Cornea, N. D., Demirci, M. F., Silver, D., Shokoufandeh, A., Dickinson, S. J., and Kantor, P. B., 2005, "3d object retrieval using many-to-many matching of curve skeletons," In International Conference on Shape Modeling and Applications, ACM.

[48] Elinson, A., Nau, D. S., and Regli, W. C., 1997, "Feature-based similarity assessment of solid models," In Fourth Symposium on Solid Modeling and Applications, C. Hoffman and W. Bronsvoort, Eds., ACM, ACM Press, pp. 297-3 10. Atlanta, Ga.

[49] Regli, W. C., and Cicirello, V., 2000, "Managing digital libraries for computer-aided design," Computer Aided Design, 32 (2) [February], pp. 119-132. Special Issue on CAD After 2000. Mohsen Rezayat, Guest Editor.

[50] McWherter, D., Peabody, M., Shokoufandeh, A., and Regli, W., 2001, "Solid model databases: Techniques and empirical results," ASME/ACM Transactions, The Journal of Computer and Information Science in Engineering, 1 (4) [December], pp. 300-310.

[51] Ramesh, M. M., Yip-Hoi, D., and Dutta, D., 2000, "A decomposition methodology for machining feature extraction," In ASME Design Engineering Technical Conferences, Computers in Engineering Conference, American Association of Mechanical Engineers, ASME Press. DETC2000/CIE-14645.

[52] Sun, T.-L., Su, C.-J., Mayer, R. J., and Wysk, R. A., 1995, "Shape similarity assessment of mechanical parts based on solid models," In ASME Design for Manufacturing Conference, Symposium on Computer Integrated Concurrent Design, R. Gadh, Ed., ASME, pp. 953-962.

[53] Cohen, K. D., 1996, Feature extraction and pattern analysis of three-dimensional objects. Master's thesis, Dartmouth College, Thayer School of Engineering, Hanover, N.H.

[54] Cybenko, G., Bhasin, A., and Cohen, K. D., 1997, "Pattern recognition of 3D CAD objects: Towards an electronic yellow pages of mechanical parts," *Smart Engineering Systems Design*, 1, pp. 1-13.

[55] Bespalov, D., Shokoufandeh, A., Regli, W. C., and Sun, W., 2003, "Scale-space representation and classification of 3d models," *ASME/ACM Transactions, Journal of Computing and Information Science in Engineering*, 3 [December], pp. 3 15-324.

[56] Bespalov, D., Shokoufandeh, A., Regli, W. C., and Sun, W., 2004, "Local feature extraction using scale-space decomposition," In ASME Design Engineering Technical Conferences, Computers and Information in Engineering Conference (DETC 2004-57702).

[57] Bespalov, D., Shokoufandeh, A., Regli, W. C., and Sun, W., 2003, "Scale-space representation of 3d models and topological matching," In Eighth ACM symposium on Solid Modeling and Applications, pp. 208-215.

[58] Ip, C. Y., Sieger, L., Regli, W. C., and Shokoufandeh, A., 2003, "Automated learning of model classifications," In Eighth ACM symposium on Solid Modeling and Applications, pp. 322-27.

[59] Lou, K., Prabhakar, S., and Ramani, K., 2004. "Content-based three-dimensional engineering shape search," In International Conference on Data Engineering.

[60] Iyer, N. and Kalyanaraman, Y., Lou, K., Jayanti, S., and Ramani, K., 2003, "A reconfigurable, intelligent 3d engineering shape search system part ii: Database indexing, retrieval and clustering," In ASME DETC 2003 Computers and Information in Engineering Conference.

[61] Iyer, N. and Kalyanaraman, Y., Lou, K., Jayanti, S., and Ramani, K., 2003, "A reconfigurable, intelligent 3d engineering shape search system part i: Shape representation," In ASME DETC 2003 Computers and Information in Engineering Conference.

[62] Bredon, G. E., 1993, *Topology and Geometry* (*Graduate Texts in Mathematics*, No 139). Springer Verlag.

[63] Thomasian, A., Castelli, V., and Li, C.-S., 1998, "Clustering and singular value decomposition for approximate indexing in high dimensional spaces," In The seventh international conference on Information and knowledge management table of contents, pp. 201-207.

[64] Eckart, C., and Young, G., 1939, "A principle axis transformation for non-hermitian matrices," *Bulletin of American Mathematical Society*, 45, pp. 118-121.

[65] Golub, G. H., and van Loan, C. F., 1989, *Matrix Computations*, Johns Hopkins Press.

[66] Cicirello, V. A., 1999, Intelligent retrieval of solid models, Master's thesis, Drexel University, Geometric and Intelligent Computing Laboratory, Department of Mathematics and Computer Science, Philadelphia, Pa. 19104, June 1999.

What is claimed is:

1. A method of searching a database using partial matching comprising the steps of:
   determining a first set of values based on predetermined properties of a query model by scale-space decomposition of local surface structure of the query model for every feature at a scale into sub-features;
   comparing said first set of values to definitions for classification, wherein said definitions for classification are based on a second set of values that is determined by decomposing features of training models into a plurality of sub-features wherein the decomposing of a feature into sub-features is continued only if decomposition separates the sub-features over a maximum angle in an angular shortest path when endpoints are drawn from distinct sub-features;
   partially matching said query model with a training model based upon said step of comparing; and
   indexing and classifying the query model.

2. The method of claim 1, wherein said comparing step compares values from a sub-graph isomorphism.

3. The method of claim 1, wherein said comparing step compares values obtained from a single scan of said query model.

4. The method of claim 1, wherein said comparing step compares values obtained from a plurality of different scans of said query model.

5. The method of claim 1, wherein said comparing step compares values for the entire query model.

6. The method of claim 1, wherein determining the first set of values comprises decomposing the query model into a plurality of features.

7. The method of claim 1, wherein the decomposing of a feature is stopped when a root branch in a feature decomposition tree reaches a predetermined depth.

8. The method of claim 1, wherein the decomposing of a feature is stopped when the distance of the angular shortest path between two triangular faces on the query model or training model is less than a predetermined value.

9. The method of claim 1, wherein the first set of values is determined by a 3D scan and the second set of values is determined from CAD models.

10. The method of claim 1, wherein said comparing step comprises the step of many-to-many comparison of groups of features of the query model to groups of features of the models for training.

11. A method of searching a database comprising the steps of:
   determining a first set of features based on predetermined properties of a query model, wherein the query model is produced with a 3D scanner;
   comparing said first set of features to a second set of sub-features based on predetermined properties of CAD models, wherein said sub-features are obtained by decomposing features of CAD models into a plurality of sub-features wherein the decomposing of a feature into sub-features is continued only if decomposition separates the sub-features over a maximum angle in an angular shortest path when endpoints are drawn from distinct sub-features;
   partially matching said first set of features to the second set of features based upon said step of comparing; and
   indexing and classifying the query model.

12. The method of claim 11, wherein the comparing step compares values from a sub-graph isomorphism.

13. The method of claim 11, wherein the comparing step comprises the step of many-to-many comparison of groups of features of the query model to groups of features of the CAD models.

14. The method of claim 11, wherein determining the first set of features comprises decomposing the query model into a plurality of features.

15. The method of claim 11, wherein the decomposing of a feature is stopped when a root branch in a feature decomposition tree reaches a predetermined depth.

16. The method of claim 15, wherein the decomposing of a feature is stopped when the distance of the angular shortest path between two triangular faces on the query model or training model is less than a predetermined value.

* * * * *